United States Patent [19]
Miyagawa et al.

[11] Patent Number: 5,594,619
[45] Date of Patent: Jan. 14, 1997

[54] PORTABLE COMPUTER COMPRISING KEYBOARD AND COORDINATE INPUT TABLET HINGEDLY CONNECTED TO A MAIN BODY CASE THROUGH A JUNCTION BASE HAVING A CYLINDRICAL ELEMENT DEFINING A LINEAR GROOVE THERETHROUGH

[75] Inventors: Shigenori Miyagawa, Tokyo; Koichi Kobayashi, Hanno; Shimpei Kunii, Tokyo; Shizuo Kamio, Tokyo; Hiroyuki Sakamoto, Tokyo; Fumitaka Sato, Tokyo; Ryoichi Ishiura, Matsudo, all of Japan

[73] Assignee: Kabushiki Kaisha Toshiba, Kawasaki, Japan

[21] Appl. No.: 362,008

[22] Filed: Dec. 22, 1994

Related U.S. Application Data

[62] Division of Ser. No. 114,090, Aug. 31, 1993, Pat. No. 5,410,447, which is a division of Ser. No. 41,890, Apr. 2, 1993, Pat. No. 5,268,817, which is a continuation of Ser. No. 692,250, Apr. 26, 1991, abandoned.

[30] Foreign Application Priority Data

| Apr. 27, 1990 | [JP] | Japan | 2-112775 |
| Nov. 21, 1990 | [JP] | Japan | 2-318403 |
| Nov. 21, 1990 | [JP] | Japan | 2-318413 |
| Nov. 21, 1990 | [JP] | Japan | 2-318414 |

[51] Int. Cl.$^6$ .............................. G06F 1/16; H05K 7/16
[52] U.S. Cl. .............................................................. 361/681
[58] Field of Search ............... 364/708.1; 248/917–923; 361/680–686; 16/366, 367

[56] References Cited

U.S. PATENT DOCUMENTS

| 4,330,776 | 5/1982 | Dennison, Jr. et al. . | |
| 4,497,036 | 1/1985 | Dunn | 364/708.1 |
| 4,545,023 | 10/1985 | Mizzi . | |
| 4,742,478 | 5/1988 | Nigro, Jr. et al. | 361/680 |
| 4,825,395 | 4/1989 | Kinser, Jr. et al. . | |

(List continued on next page.)

FOREIGN PATENT DOCUMENTS

| 0246021 | 11/1987 | European Pat. Off. . |
| 0251492 | 1/1988 | European Pat. Off. . |
| 0307892 | 3/1989 | European Pat. Off. . |
| 0355203 | 2/1990 | European Pat. Off. . |
| 63-39731 | 3/1988 | Japan . |
| 21040 | 9/1906 | United Kingdom . |

OTHER PUBLICATIONS

Judith A. Layman and Mark A. Smith, "Mechanical Design of the HP-18C and HP-28C Handheld Calculators," Hewlett-Packard Journal, Aug. 1987, No. 8, pp. 17–20.
Koga et al., "Development and Evaluation of an Input Integrated Flat Panel Display," Journal of Academic Thesis on Information Systems, vol. 27, No. 6, Jun. 1986. (In Japanese).
Epson "EQUITY LT", Mar. 1988, brochure.
NEC ProSpeed 386 Catalog, Copyright 1988.
"Two-Sided Keyboard for a Data Terminal," IBM Technical Disclosure Bulletin, vol. 24, No. 1B, Jun. 1981, p. 714.

*Primary Examiner*—Michael W. Phillips
*Attorney, Agent, or Firm*—Finnegan, Henderson, Farabow, Garrett & Dunner, L.L.P.

[57] ABSTRACT

A main body case encasing a keyboard and an upper case encasing an integrated display/input device are coupled by first and second hinge units and a junction base (with a cylindrical element defining a linear groove there through) to be arbitrarily pivotal from a state wherein the keyboard faces the integrated display/input device to a state wherein the back surface of the integrated display/input device faces the keyboard. Depending on the position of the integrated display/input device, a mode designation means designates one of first and second modes, the first mode being a mode in which the integrated display/input device performs an operation in an ordinary manner, the second mode being a mode in which the integrated display/input device performs an operation in a manner reversed 180° with reference to the coordinate system in the first mode.

6 Claims, 22 Drawing Sheets

U.S. PATENT DOCUMENTS

| | | |
|---|---|---|
| 4,842,531 | 6/1989 | Takemura . |
| 4,859,092 | 8/1989 | Makita . |
| 4,903,222 | 2/1990 | Carter et al. . |
| 4,960,256 | 10/1990 | Chihara et al. . |
| 5,016,849 | 5/1991 | Wu ................................... 361/681 X |
| 5,034,858 | 7/1991 | Kawamoto et al. ................ 361/681 X |
| 5,077,551 | 12/1991 | Saitou ................................ 361/680 X |
| 5,115,374 | 5/1992 | Hongoh .................................. 361/681 |
| 5,133,076 | 7/1992 | Hawkins et al. ............... 364/709.09 X |
| 5,168,423 | 12/1992 | Ohgami et al. ......................... 361/681 |

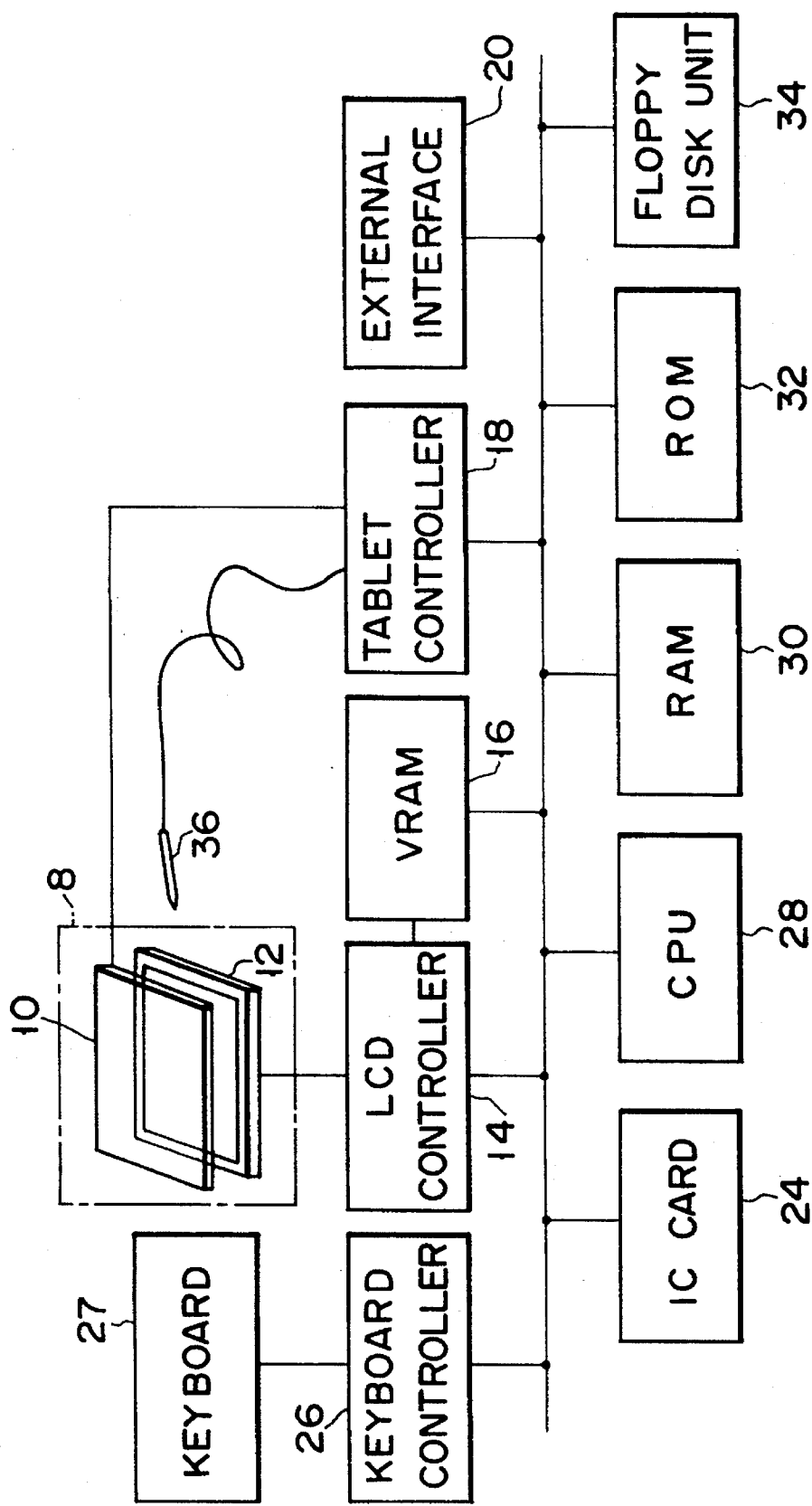
F I G. 5

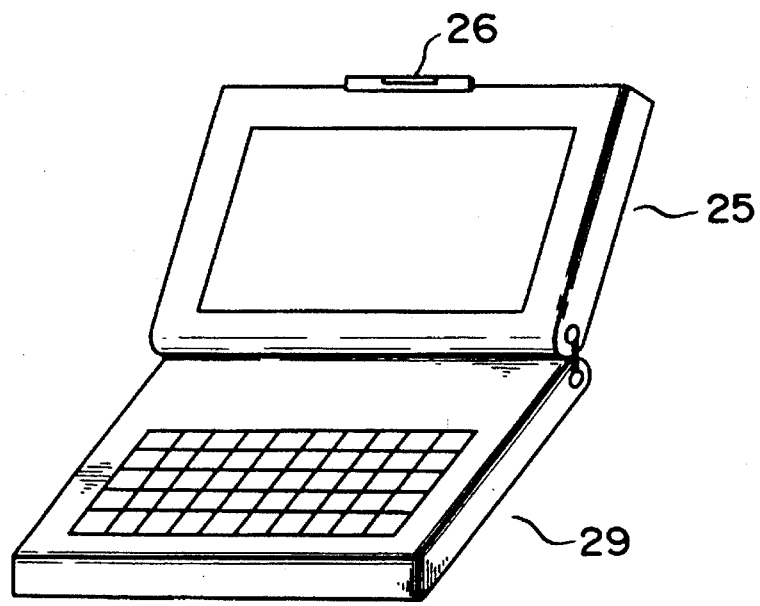
F I G. 6A
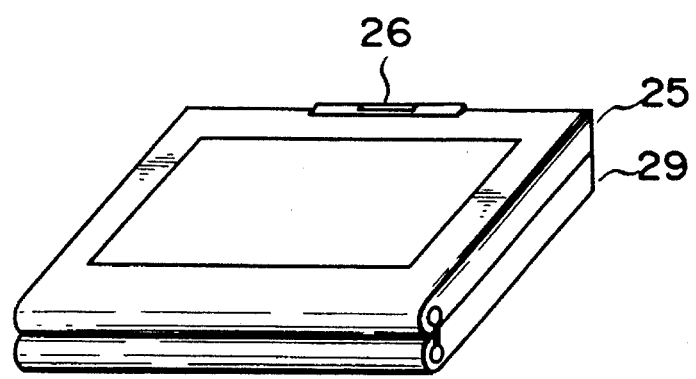
F I G. 6B

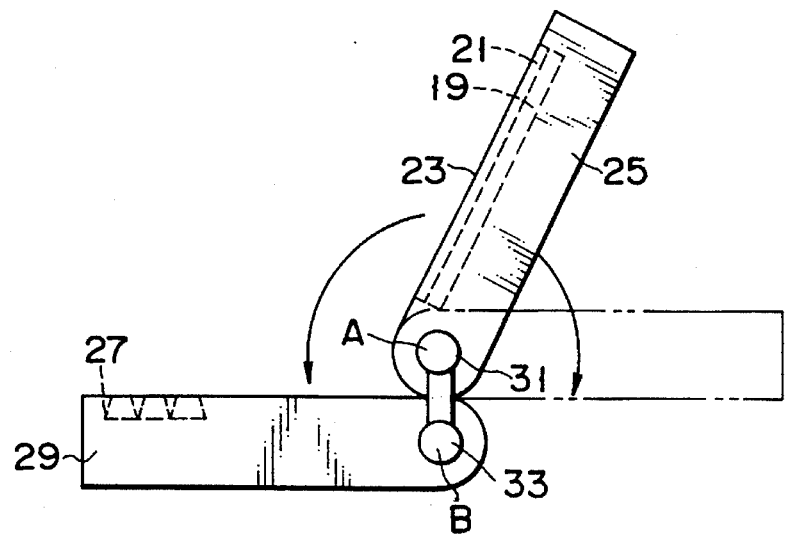
FIG. 7A
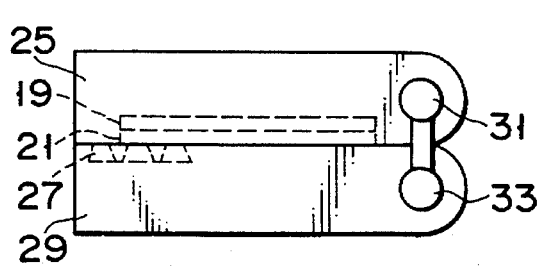 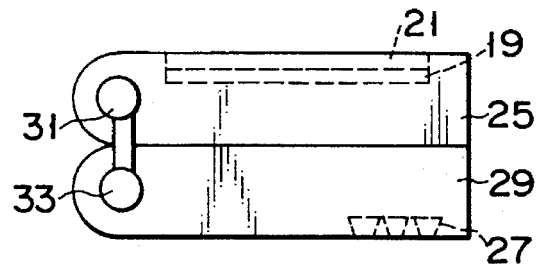
FIG. 7B  FIG. 7C
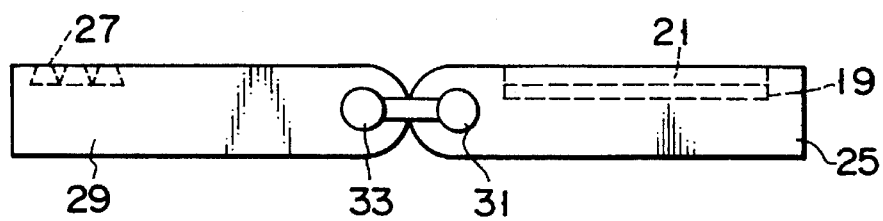
FIG. 7D

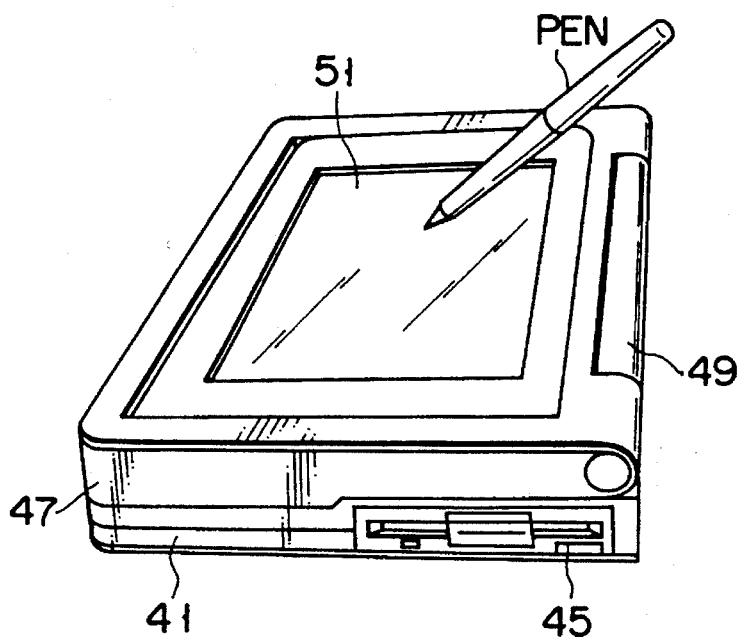
F I G. 16
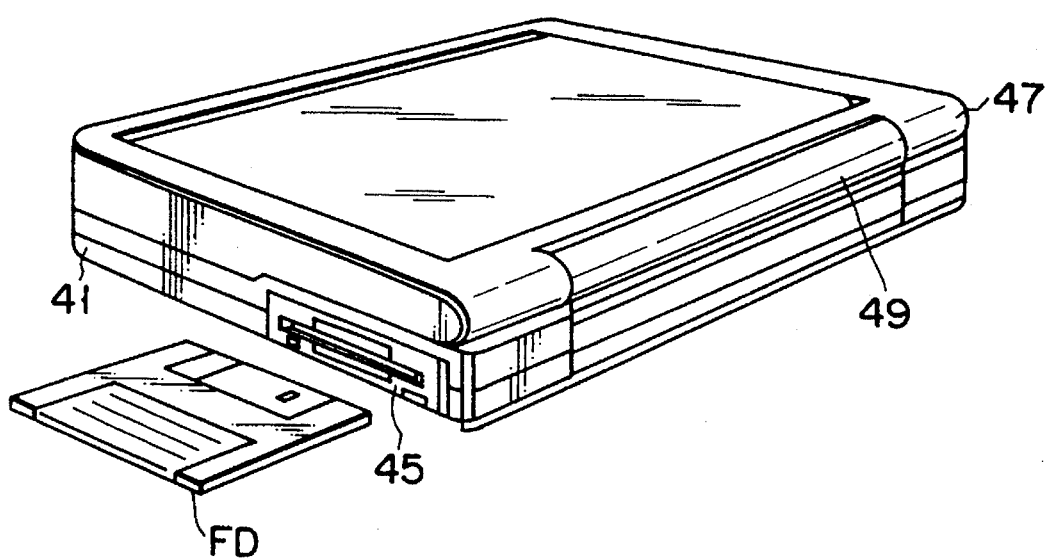
F I G. 17

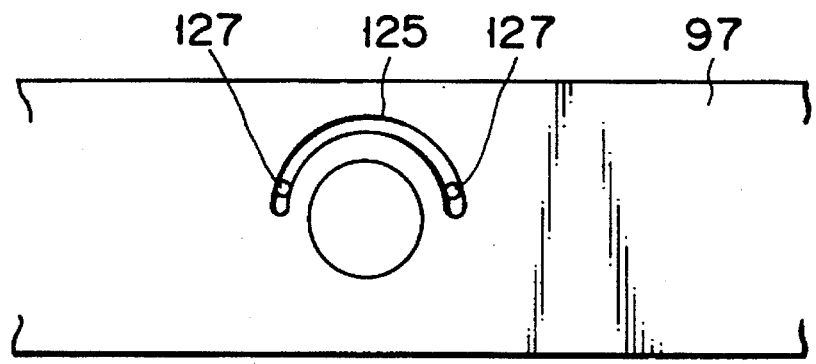
F I G. 29
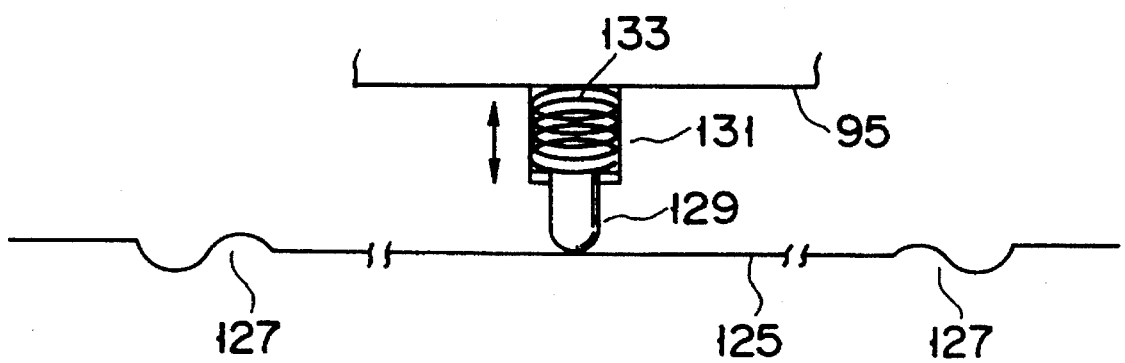
F I G. 30

NORMAL ADDRESS

| 0000 | 0001 | 0002 | | 004F |
|------|------|------|--|------|
| 2000 | 2001 | | | |
| ⋮ | ⋮ | | | ⋮ |
| 7EF0 | 7EF1 | | 7F3E | 7F3F |

FIG. 32A

DISPLAY ADDRESS AFTER REPLACEMENT

| 7F3F | 7F3E | 7F3D | | 7EF1 | 7EF0 |
|------|------|------|--|------|------|
| ⋮ | ⋮ | ⋮ | | ⋮ | ⋮ |
| 004F | | | | 0001 | 0000 |

FIG. 32B

NORMAL DATA

REPLACEMENT DATA

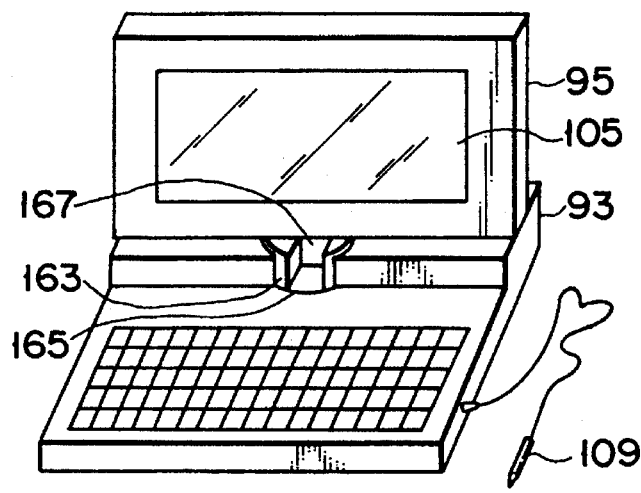
F I G. 34
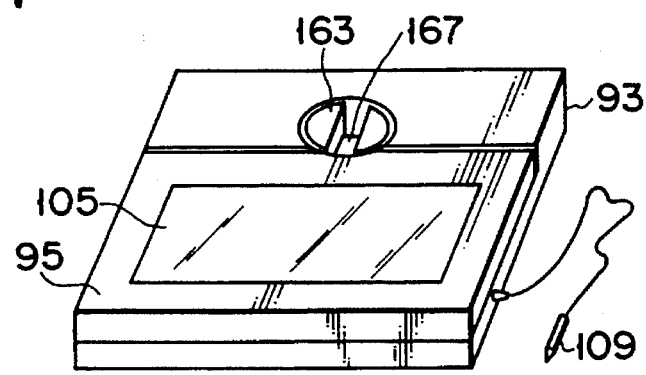
F I G. 35
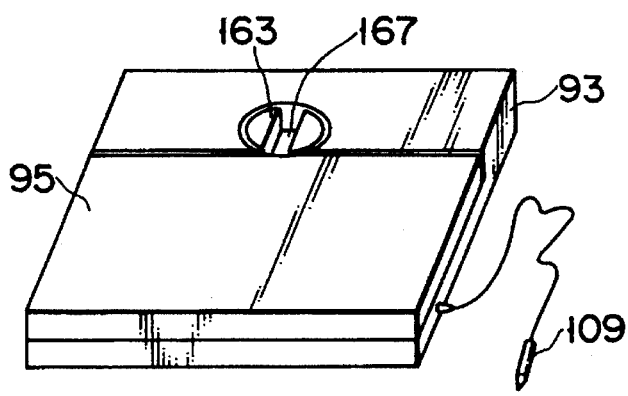
F I G. 36

PORTABLE COMPUTER COMPRISING KEYBOARD AND COORDINATE INPUT TABLET HINGEDLY CONNECTED TO A MAIN BODY CASE THROUGH A JUNCTION BASE HAVING A CYLINDRICAL ELEMENT DEFINING A LINEAR GROOVE THERETHROUGH

This is a division of application Ser. No. 08/114,090 filed Aug. 31, 1993, (now U.S. Pat. No. 5,910,447), which is a divisional of Ser. No. 08/041,890 filed Apr. 2, 1993(now U.S. Pat. No. 5,268,817), which is a continuation of application Ser. No. 07/692,250, filed Apr. 26, 1991, now abandoned.

BACKGROUND OF THE INVENTION

1. Field of the Invention

The present invention relates to a portable computer which comprises a keyboard and a coordinate input tablet as data input means.

2. Description of the Related Art

In general, in a so-called lap-top type personal computer or wordprocessor which aims at a compact structure, as shown in FIG. 1, a low-profile flat display unit 3 comprising, e.g., a liquid crystal display (LCD) 1 is coupled to be able to be folded to oppose a keyboard 7 of a main body case unit 5, and to be opened to stand up. With this structure, when a user carries the computer, he or she folds the display unit to make it look like an attache case, and when he uses it, he opens the display unit to watch the screen.

In a conventional portable computer of this type, a keyboard is mainly used for inputting data, such as commands, characters, and the like by a user. For this reason, in order to use the computer, a user must be able to operate the keyboard. However, the user must be accustomed with the keyboard to some extent before he or she can efficiently input data. For this reason, a demand has arisen for an input means which is easier to operate for a user who is not accustomed with the operation of the keyboard.

Under the circumstances, a tablet which can input data using a pen like in handwriting has been developed. FIGS. 2 through 4 show arrangements of portable computers each of which comprises both a tablet and a keyboard.

In the portable computer shown in FIG. 2, a display unit 3 is stored in an upper cover 9, and a keyboard 7 is stored in a main body case 5. The upper cover 9 is coupled to the main body case 5 by hinge portion 11. A tablet 13 is separated from the main body, and is connected to the main body case 5 via a cord 15.

In the portable computer shown in FIG. 3, the tablet 13 is rendered compact, and is assembled in the main body case 5 to be adjacent to the keyboard 7.

In recent years, an integrated display/input device 17 which is integrated by overlaying the transparent tablet 13 on the display unit 3 has been developed as an input means, as shown in FIG. 4. In the integrated display/input device 17, a content displayed on the display unit 3 can be visually observed through the tablet 13, and coordinate data corresponding to a display screen is input by writing on the tablet 13 using a pen in accordance with the displayed content. The coordinate data input from the tablet 13 designates an icon displayed on the display unit 3, and is used as a character pattern. Since the integrated display/input device 17 allows a user to input data as if he or she wrote on paper with a pencil, anyone can easily operate the device 17.

In the portable computer shown in FIG. 4, the integrated display/input device 17 is assembled in the main body case 5, and the keyboard 7 is connected to the integrated display/input device 17 via the cord 15.

However, the portable computer shown in FIG. 2 cannot be rendered compact, and is inconvenient for carrying since the tablet 13 is separated from the main body. Since a data input position is different from a display position, integrated input/display feeling cannot be obtained.

In the portable computer shown in FIG. 3, when the overall computer is rendered compact, the sizes of the tablet 13 and the keyboard 7 become very small. Therefore, the computer shown in FIG. 3 is not easy to use, resulting in poor operability.

Furthermore, the portable computer shown in FIG. 4 cannot be rendered compact since the display unit 3 and the transparent tablet 13 are assembled in the main body case 5, and the keyboard 7 is separated. Therefore, a wide installation area is required in a data input state, and the computer shown in FIG. 4 is inconvenient for carrying. Furthermore, since the display surface (the tablet 13 and the display unit 3) of the integrated display/input device 17 are exposed, the computer must be carefully carried.

SUMMARY OF THE INVENTION

It is an object of the present invention to provide a portable computer which comprises a keyboard and a tablet, which can be rendered compact, and can provide improved input operation performance.

According to the first aspect of the present invention, a portable computer comprises: keyboard means for inputting data; main body case means for storing the keyboard means; an integrated display/input device which is constituted by a display device for displaying data, and a tablet for inputting coordinate data, and is integrated by overlaying the tablet on a display surface of the display device; cover means for storing the integrated display/input device; and hinge means for pivotally coupling the main body case means and the cover means from a state wherein the main body case means and the cover means overlap each other so that the keyboard means and the integrated display/input device face each other to a state wherein the main body case means and the cover means overlap each other so that back surfaces thereof face each other.

According to the second aspect of the present invention, a portable computer comprises: a main body unit for storing a keyboard; display/input means integrated by overlaying a coordinate input tablet on a display device; a support unit for supporting the display/input means; a first hinge mechanism unit for coupling the support unit to the main body unit; and a second hinge mechanism unit for rotatably coupling the display/input means to the support means as an outer frame.

According to the third aspect of the present invention, a portable computer comprises: a main body case for storing a keyboard; an upper cover; a first hinge mechanism for coupling the upper cover to the main body case; input/display means integrated by overlaying a coordinate input tablet on a display device; a second hinge mechanism for rotatably coupling the input/display means to the upper cover as an outer frame; and a rotational range regulating mechanism for regulating a rotational range of the input/display means by the second hinge mechanism.

According to the fourth aspect of the present invention, a portable computer comprises: a main body case for storing a keyboard; integrated display/input means integrated by overlaying a coordinate input tablet on a display device; an upper cover for storing the integrated display/input means; a junction upper cover; a first hinge mechanism for rotatably coupling the junction upper cover to the main body case; and a second hinge mechanism for rotatably coupling the upper cover to the junction upper cover.

According to the fifth aspect of the present invention, a portable computer comprises: a main body case for storing a keyboard; integrated display/input means integrated by overlaying a coordinate input tablet on a display device; an upper cover for storing the integrated display/input means; a junction base; a rotating mechanism for rotatably coupling the junction base to the main body case; and a hinge mechanism for rotatably coupling the upper cover to the junction base.

According to the present invention, since a tablet having substantially the same size as that of a display unit is arranged without reducing the size of a keyboard, good data input operability can be assured. Furthermore, an upper cover main body and a main body case overlap each other by a hinge means so that a display screen of an integrated display/input device faces up. As a result, good input operability can be provided, and a compact structure which does not limit a location of use can be provided.

Since an input/display unit is coupled in an upper cover by a hinge mechanism which allows pivotal movement, a portable computer which can be set in a desired state, is compact, and has good input operability can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram showing an arrangement of a portable computer system according to an embodiment of the present invention;

FIGS. 6A and 6B are perspective views showing a portable computer shown in FIG. 5 in which FIG. 6A shows a state wherein an upper cover is opened and FIG. 6B shows a state wherein the upper cover is overlaid on the main body case;

FIGS. 7A through 7D are side views of the portable computer shown in FIGS. 6A and 6B;

FIGS. 8A and 8B are perspective views showing a portable computer according to the second embodiment of the present invention in which FIG. 8A shows a state wherein the upper cover is opened and FIG. 8B shows a state wherein the upper cover is overlaid on the main body, case;

FIG. 16 is a perspective view showing a handwriting input state of the portable computer shown in FIG. 12;

FIG. 17 is a perspective view showing an FD insertion state in the portable computer shown in FIG. 12;

FIG. 29 is a top view of a junction upper cover for explaining a rotation brake mechanism in the fifth embodiment;

FIG. 30 is a sectional view for explaining the rotation brake mechanism;

FIGS. 32A and 32B are tables for explaining correction of display addresses;

FIG. 34 is a perspective view showing a keyboard input mode state in a portable computer according to the sixth embodiment of the present invention;

FIG. 35 is a perspective view showing a handwriting input mode in the portable computer of the sixth embodiment; and FIG. 36 is a perspective view of a non-use state of the portable computer of the sixth embodiment.

DETAILED DESCRIPTION OF THE PREFERRED EMBODIMENTS

Figure 1:
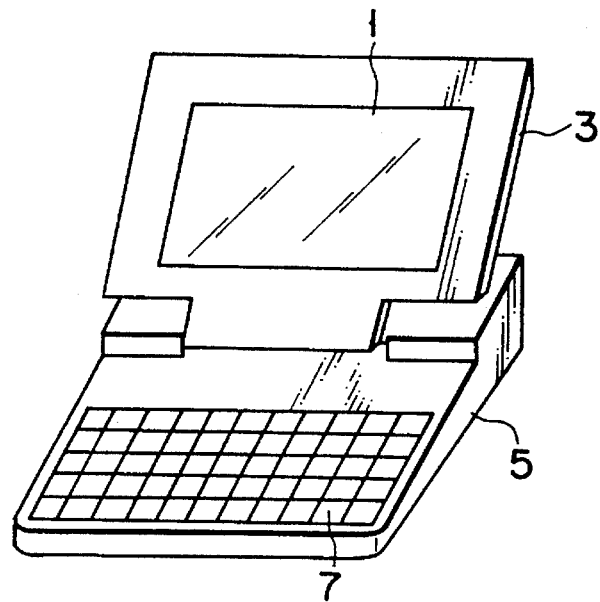
FIG. 1 is a perspective view showing an outer appearance of a typical lap-top type personal computer or wordprocessor.
Figure 2:
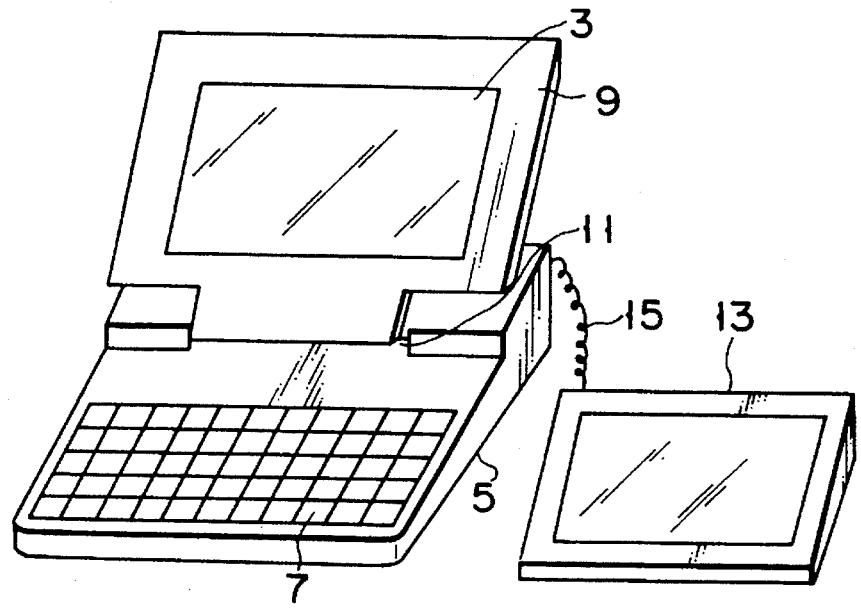
FIG. 2 is a perspective view showing an outer appearance of a conventional portable computer whose tablet is connected to a computer main body via a cord.
Figure 3:
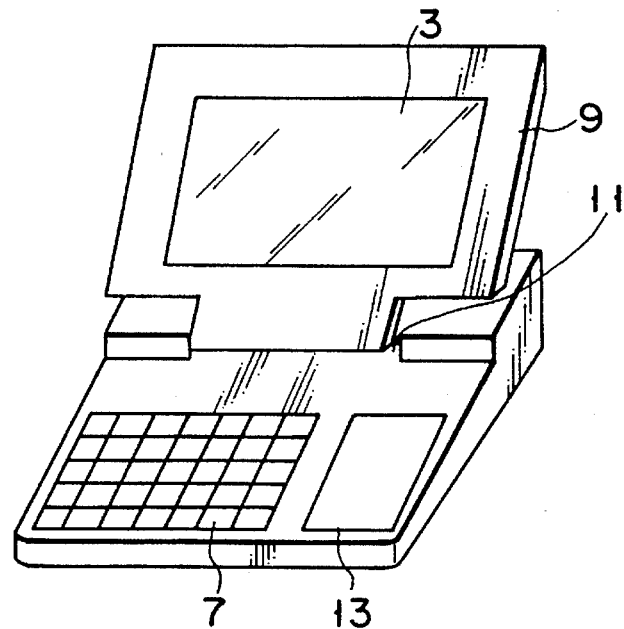
FIG. 3 is a perspective view showing an outer appearance of a conventional portable computer in which a compact tablet is assembled in a computer main body.
Figure 4:
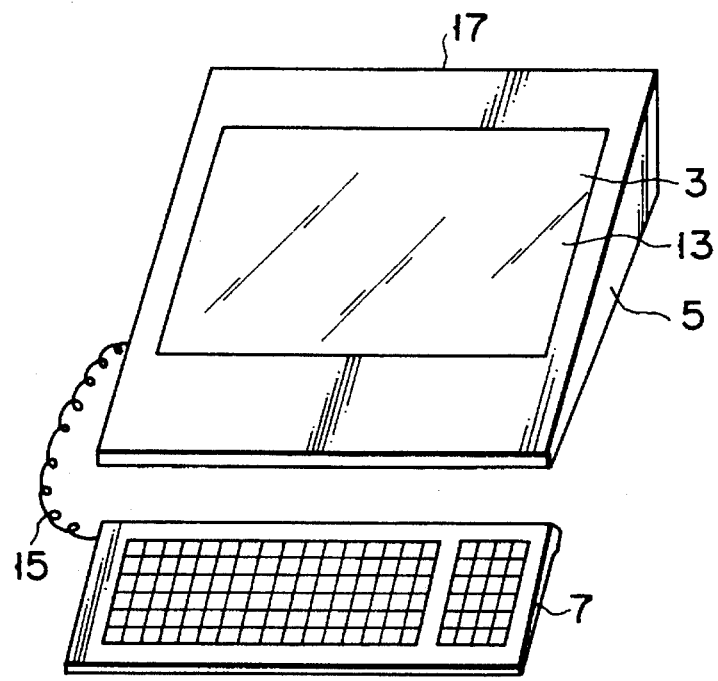
FIG. 4 is a perspective view showing an outer appearance of a conventional portable computer in which an integrated display/input device is assembled in a main body case, and a keyboard is connected to the main body via a cord.

FIG. 5 is a block diagram showing an arrangement of a portable computer system according to the first embodiment of the present invention. As shown in FIG. 5, the computer system of this embodiment comprises a keyboard 27 for inputting data, a keyboard controller 26 for controlling the keyboard 27, an integrated display/input device 8 integrated by overlaying an input tablet 10 on a liquid crystal display (LCD) 12, an LCD controller 14 for controlling the LCD 12, a tablet controller 18 for controlling the tablet 10, a stylus pen 36 for inputting coordinate data on the tablet 10, an external interface 20 such as an RS-232C, for interfacing with an external equipment connected as an optional equipment, an IC card 24, a random access memory (RAM) 30 for storing data and programs, a read only memory (ROM) 32 for storing a system program, and standard patterns and dictionaries used for recognizing characters input by handwriting, a floppy disk unit 34, and a central processing unit (CPU) 28 for controlling the above-mentioned units. The tablet is of an electromagnetic induction type. More specifically, a high-frequency current is flowed through a coil incorporated in the stylus pen 36, and a voltage induced by the current in the tablet 10 is processed to obtain the position of the stylus pen 36. In a handwriting input mode, a handwritten character written on the tablet 10 using the stylus pen 36 is output from the tablet 10 as x- and y-coordinate data, and the data are stored in the RAM 30 via the tablet controller 18. The CPU 28 recognizes a pattern using a pattern expressed by the x- and y-coordinate data stored in the RAM 30, a standard pattern prestored in the ROM, and a dictionary by, e.g., a composite similarity method, and stores the recognized character in a VRAM 16. Thereafter, the CPU 28 causes the LCD 12 to display the recognized character via the LCD controller 14. Key data input from the keyboard 27 is stored in the RAM 30, and is then displayed on the LCD 12 via the LCD controller 14.

FIGS. 6A and 6B are perspective views showing an arrangement of the portable computer according to the first embodiment of the present invention. FIG. 6A shows a state wherein an upper cover 25 is opened and FIG. 6B shows a state wherein the upper cover 25 is overlaid on the main body case 29. When the upper cover 25 and the main body case 29 overlap each other, the upper cover 25 is fixed by a lock mechanism 26.

FIGS. 7A through 7D are side views showing an arrangement of the portable computer according to the first embodiment of the present invention. The portable computer shown in FIGS. 7A through 7D comprises the keyboard 27 and an integrated display/input device 23. More specifically, the integrated display/input device 23 integrated by overlaying a transparent tablet 21 on a display unit 19 comprising, e.g., an LCD, is arranged in an upper cover 25. The keyboard 27 is stored in a main body case 29. The upper cover 25 and the main body case 29 are coupled to each other by hinge units 31 and 33 arranged near their end portions. The hinge units 31 and 33 are provided with a balance function capable of setting an arbitrary angle by a brake function by means of a torsion bar function, a frictional hinge, or the like. A rotational range of the upper cover 25 and the main body case 29 by the hinge units 31 and 33 is set to be, e.g., 180°.

FIG. 7A shows a setup state when the keyboard 27 is used as an input means. When the keyboard 27 is used, a latch mechanism (to be described later), arranged on, e.g., the front edge of the main body case 29 (on a side opposite to the hinge unit 33), for fixing the upper cover 25 to oppose the main body case 29 is disengaged, thereby setting the hinge unit 33 in a neutral state. The upper cover 25 is lifted up about a point A of the hinge unit 31 in a state wherein the surface provided with the keyboard 27 of the main body case 29 faces up. Thus, the display surface of the integrated display/input device 23 opposes a user. If the rotational range of the hinge unit 31 is set to be 180°, the setup angle of the upper cover 25 can be arbitrary changed within a range of 0° through 180°. Thus, the user can visually observe a content displayed on the display unit 19 through the transparent tablet 21. Note that signal lines for connecting the main body case 29 and the upper cover are arranged in a cavity (not shown) of the hinge unit 31.

FIG. 7B shows a setup state when the portable computer is stored or carried. In this case, the hinge units 31 and 33 are set in a neutral state. Then, the upper cover 25 is overlaid on the main body case 29, and is fixed by the latch mechanism. Thus, the computer can be fixed in a state wherein the display surface of the integrated display/input device 23 opposes the keyboard 27. More specifically, the upper cover 25 serves as a protection case.

FIG. 7C shows a setup state wherein only the integrated display/input device 23 is used for a handwriting input without using the keyboard 27. When only the integrated display/input device 23 is used, the hinge unit 31 is opened through 180°, thus unlocking the hinge unit 33. When the hinge unit 33 is pivoted along a circular path about a point B, the main body case 29 and the upper cover 25 overlap each other so that the back surface (bottom surface) of the main body case 29 faces the back surface (top surface, on a side without the integrated display/input device 23) of the upper cover 25. In this state, the integrated display/input device 23 faces up, and is set in a horizontal state. Therefore, a handwriting input using the pen on the transparent tablet 21 is facilitated, thus greatly improving operability.

FIG. 7D shows a setup state when both the keyboard 27 and the integrated display/input device 23 are used as the input means. When both the keyboard 27 and the integrated display/input device 23 are used, the angle defined between the upper cover 25 and the main body case 29 is set to be 180° by utilizing a setup operation, so that the keyboard 27 and the display surface of the integrated display/input device 23 face up. In this state, both a key input and a handwriting input can be simultaneously performed.

Figure 8A:
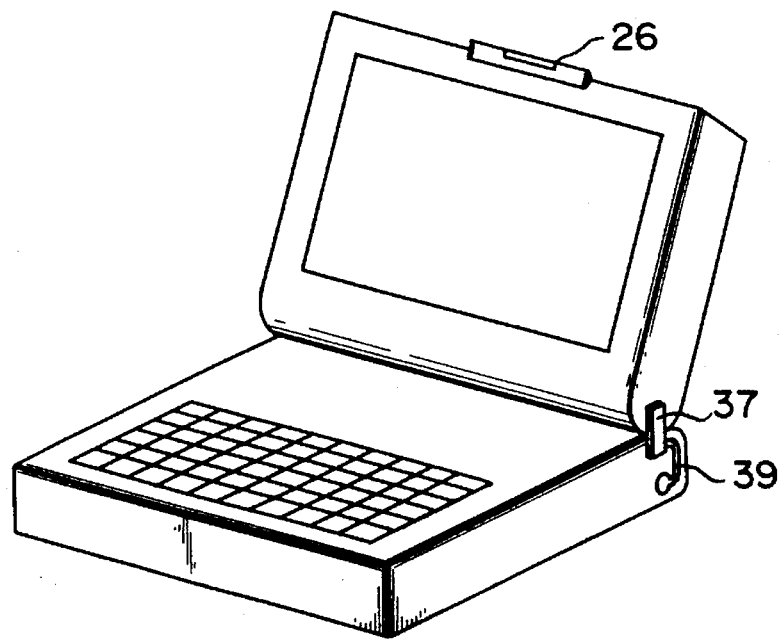
Figure 8B:
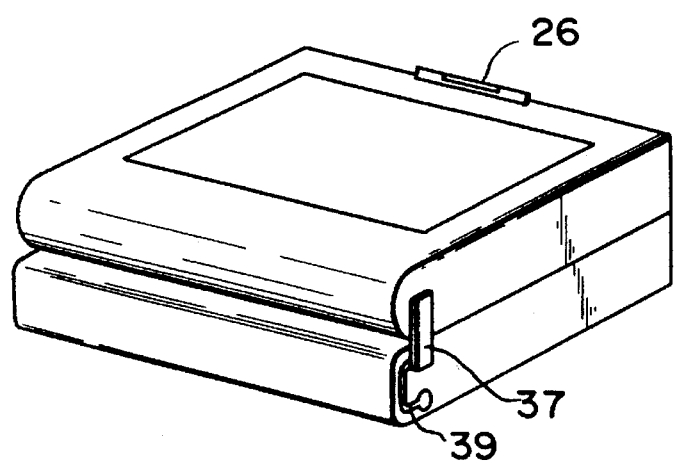

The second embodiment of the present invention will be described below. In the second embodiment, arrangements of the hinge units 31 and 33 are different from those in the first embodiment. For other portions, the same reference numerals denote the same parts as in the first embodiment, and a detailed description thereof will be omitted. In this embodiment, as shown in FIGS. 8A and 8B, a hinge unit 37 is movable along a hinge rail 39 provided along the outer periphery near the end portion of a main body case 29.

An upper cover 25 and a main body case 29 of the portable computer according to the second embodiment are coupled by a first hinge unit 35 and second hinge unit 38 like in the first embodiment. The first hinge unit 35 can cause the upper cover 25 to pivot about a point C within a rotational range of 180°. The second hinge unit 38 can cause the main body case 29 to pivot about a point D within a rotational range of 180°. The hinge unit 37 a combination of the first hinge unit 35 and the second hinge unit 38, is held at an end portion 39a or 39b of the hinge rail 39 so as not to be accidentally moved along the hinge rail 39.

Figure 9:
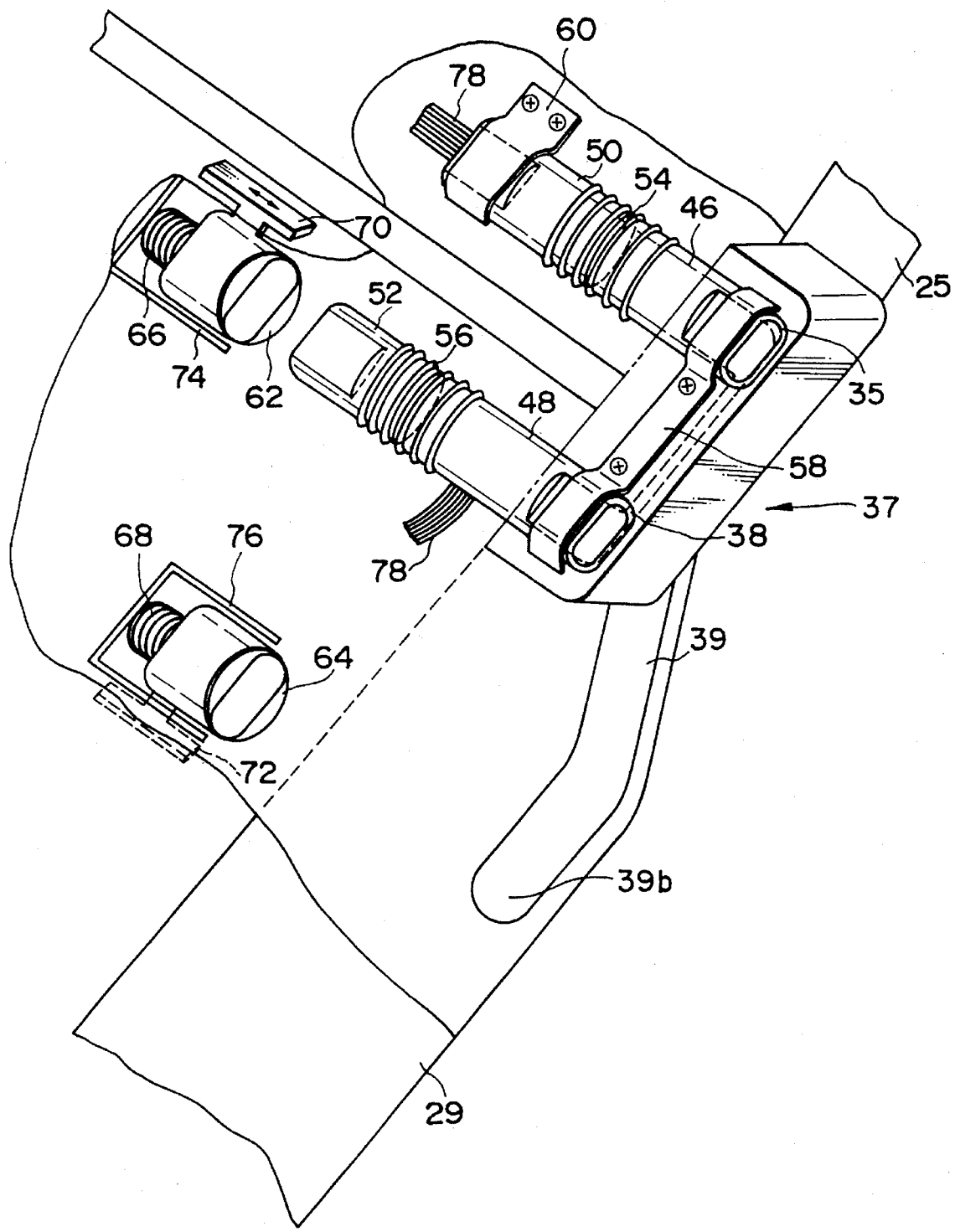
FIG. 9 is a partially cutaway perspective view showing a detailed mechanism of a hinge unit shown in FIGS. 6A–6B, 7, 8A–8B, 10A–10C, and 11A–11B.

FIG. 9 shows the hinge unit 37 in detail.

In FIG. 9, hinge female portions 46 and 48 are engaged with hinge male portions 50 and 52 (to be described later), and the engaging portions are covered with hinge springs 54 and 56 to fasten the hinge female portions 46 and 48 and the hinge male portions 50 and 52 to each other. The hinge male portions 50 and 52 are engaged with the hinge female portions 46 and 48. The hinge springs 54 and 56 are wound around the engaging portions between the hinge male portions 50 and 52 and the hinge female portions 46 and 48 to provide a frictional resistance to rotation of the hinges. A hinge press member 60 serves to fix the hinge male portion 50, and a hinge press member 58 serves to fix the hinge female portion 48.

Movable hinge press members 62 and 64 are arranged in the main body case 29, and serve to fix the end of the hinge male portion 52 which is pivoted along the hinge groove 39. The movable hinge press members 62 and 64 are located in the main body case 29 on extending lines of two terminal ends of the hinge groove 39 when the main body case 29 is viewed from its side surface. The hinge press members 62 and 64 each have a large dish-like shape to easily receive the hinge male portions 50 and 52.

Movable hinge press springs 66 and 68 are compression springs for causing the movable hinge press members 62 and 64 to disengage/engage from/with the hinge male portion 52. The springs 66 and 68 normally apply forces for causing the movable hinge press members 62 and 64 to engage with the hinge male portion 52. Movable hinge press unlock switches 70 and 72 are coupled to the movable hinge press members 62 and 64, and project from the surface of the main body case 29. When the switch 70 or 72 is operated by an operator, the hinge second unit 38 can be unlocked. Movable hinge press rails 74 and 76 have a function of preventing the movable hinge press members 62 and 64 from being offset upon their movements in the right-and-left direction, and a function of receiving the movable hinge press springs 66 and 68. The movable hinge press rails 74 and 76 are firmly fixed to the main body case 29 since they receive large torsion forces. Signal lines 78 are used as data signal lines for LCD and tablet coordinate data, and are arranged in cavities of the first and second hinge units 35 and 38. Signal line protection members are used in the main body case 29 to prevent the signal lines from being disconnected by a hinge operation.

The relationship between the first and second hinge units 35 and 38, and the hinge groove 39 will be explained below. When the keyboard 27 and the integrated display/input device 23 overlap each other while facing each other, the upper cover 25 is lifted up. In this case, the hinge unit 37 is rotated and is fixed in position by means of, e.g., a frictional hinge. In order to pivot the second hinge unit 38, the movable hinge press unlock switch 70 is slid. As a result, the locked movable hinge press member 62 is unlocked, and the second hinge unit 38 is set in a free state, and can be desirably moved from the end portion 39a to the end portion 39b of the hinge groove 39. Thus, the second hinge unit 38 is moved from the end portion 39a to the end portion 39b of the hinge groove 39, i.e., to a back surface portion of the main body case 29. In this case, the ends of the hinge male portions 50 and 52 of the second hinge unit 38 abut against the movable hinge press members 62 and 64. The movable hinge unlock switches 70 and 72 are pulled to prevent abutments between the hinge male portions 50 and 52 and the hinge press members 62 and 64, and the hinge male portion 52 is guided to the end portion 39b of the hinge groove 39. When the hinge male portion 52 is guided to the end portion 39b of the hinge rail, the upper cover 25 is swung about the second hinge unit 38, and the end of the hinge male portion 52 is inserted in a receiving portion of the movable hinge press member 64. The movable hinge press spring 68 is arranged behind the movable hinge press member 64 to prevent the hinge male portion 52 and the movable hince press member 64 from being disengaged from each other. In addition, the movable hinge press rail 76 is formed, so that the movable hinge press spring 68 supports the movable hinge press member 64 from the main body case 29. When the hinge male portion 52 is inserted in the movable hinge press member 64, the second hinge unit 38 completes fixing, and the upper cover 25 is overlaid on the back surface of the main body in use.

The above description has exemplified only a method of moving the integrated display/input device from a surface where it faces the keyboard to the back surface. When the integrated display/input device is returned to an original position, it is operated in the same method as described above. The above description has exemplified only a hinge mechanism on the right end portion of the apparatus. However, the same mechanism is used in the left end portion.

Figure 10A:
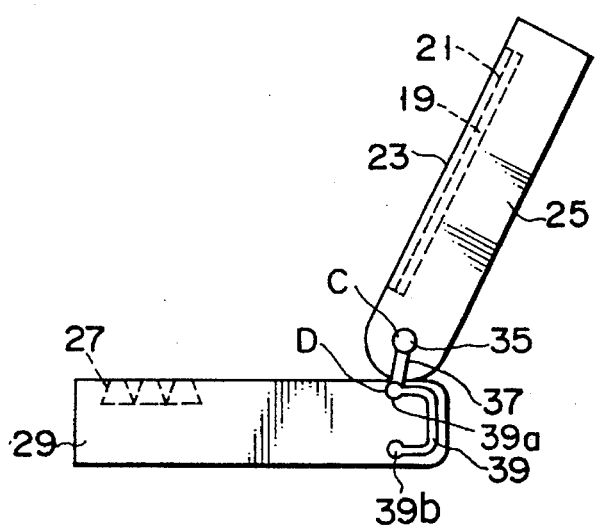
FIGS. 10A through 10C are side views of the portable computer according to the second embodiment of the present invention.

FIG. 10A shows a setup state wherein the keyboard 27 is used as the input means. In this case, the hinge unit 37 is held at the end portion of the hinge rail 39. The main body case 29 is set in a state wherein the surface provided with the keyboard 27 faces up, and the upper cover is lifted up about a point D of the hinge unit 37, so that the display screen of the integrated display/input device 23 faces a user.

Figure 10B:
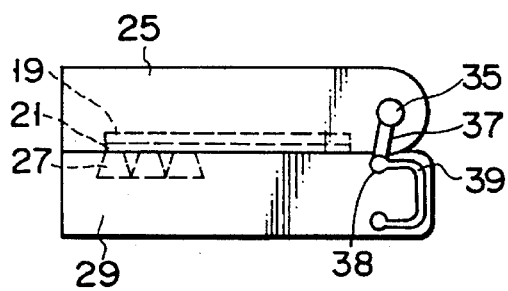

FIG. 10B shows a setup state wherein the portable computer is stored or carried. In this case, the upper cover 25 is overlaid on the main body case 29 while the hinge unit 37 is held at the end portion 39a of the hinge groove 39, and the upper cover 25 and the main body case 29 are fixed by the latch function.

Figure 10C:
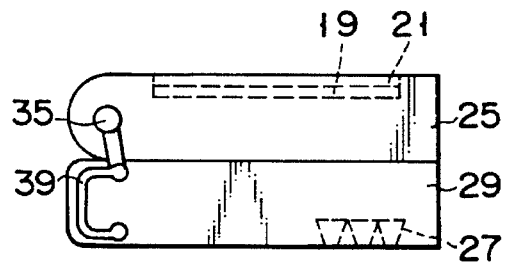

FIG. 10C shows a setup state wherein only the integrated display/input device 23 is used as the hand-writing input means without using the keyboard 27. In this case, the first hinge unit 35 is unlocked through 180° to unlock the hinge unit 37, thereby setting the point D of the hinge unit 37 in a neutral state. As a result, the hinge unit 37 is moved to the end portion 39b of the hinge groove 39 via the groove 39 so as to be pivoted along a circular path having the point D as the center. Thus, the main body case 29 and the upper cover 25 overlap each other so that the back surface (bottom surface) of the main body case 29 faces the back surface of the upper cover 25. As a result, the integrated display/input device is ready to use. In this state, since the integrated display/input device 23 faces up, and is set in a horizontal state, a handwriting input operation using a pen on the transparent tablet 21 is facilitated, thus greatly improving operability.

When both the keyboard 27 and the integrated display/input device 23 are used, they can be set in the same manner as in the first embodiment.

The system of the second embodiment is effective when the upper cover 25 and the main body case 29 have different thicknesses. For example, when the thickness of the main body case 29, which is increased upon improvement of its functions, is different from the thickness of the upper cover 25 which stores a low-profile display device such as an LCD, the portable computer is not easy to use if the hinge units 31 and 33 of the first embodiment are employed.

Figure 11A:
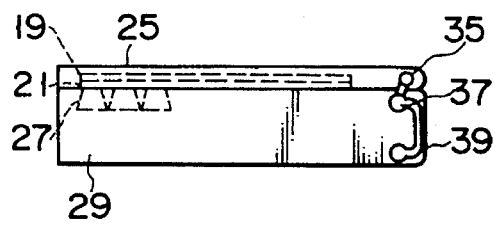
FIGS. 11A and 11B are side views, corresponding to FIGS. 10A and 10B, showing a case wherein an upper cover and a main body case have different thicknesses.
Figure 11B:
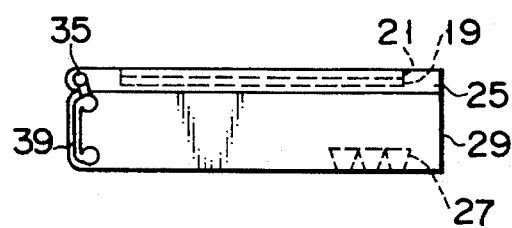

FIGS. 11A and 11B show cases wherein the upper cover 25 and the main body case 29 have different thicknesses in correspondence with FIGS. 10A and 10B, respectively.

As described above, according to the first and second embodiments, the portable computer comprises the integrated display/input device 23 constituted by overlaying the transparent tablet 21 on the display unit 19 as one input means. According to this integrated display/input device 23, since a data input position is the same as a display position, an integrated display/input feeling can be obtained, and data can be input like a writing operation on paper with a pencil.

The upper cover 25 provided with the integrated display/input device 23 and the main body case 29 provided with the keyboard 27 are coupled by the hinge units which allow rotation within a predetermined angular range. Thus, since two independent input means can be arranged, the keyboard 27 and the transparent tablet 21 can have sufficient sizes. Therefore, data input efficiency can be improved.

Since the upper cover 25 and the main body case 29 can overlap each other and can be fixed in position so that the keyboard 27 and the integrated display/input device 23 face each other, the computer can be rendered compact without exposing the display screen and the keyboard 27, and is convenient for carrying.

Furthermore, in a data input mode, the states of the upper cover 25 and the main body case 29 can be desirably set in accordance with the input means to be used (the keyboard 27, or the integrated display/input device 23, or both the keyboard and the integrated display/input device). In particular, when only the integrated display/input device is used, as shown in FIGS. 6C and 10C, the computer can be rendered compact since the upper cover 25 and the main body case 29 can overlap each other. Thus, the computer does not require a large installation area. A handwriting input operation using a pen on the transparent tablet 21 can be facilitated, thereby greatly improving operability.

The third embodiment of the present invention will be described below with reference to FIGS. 12 through 17.

Figure 12:
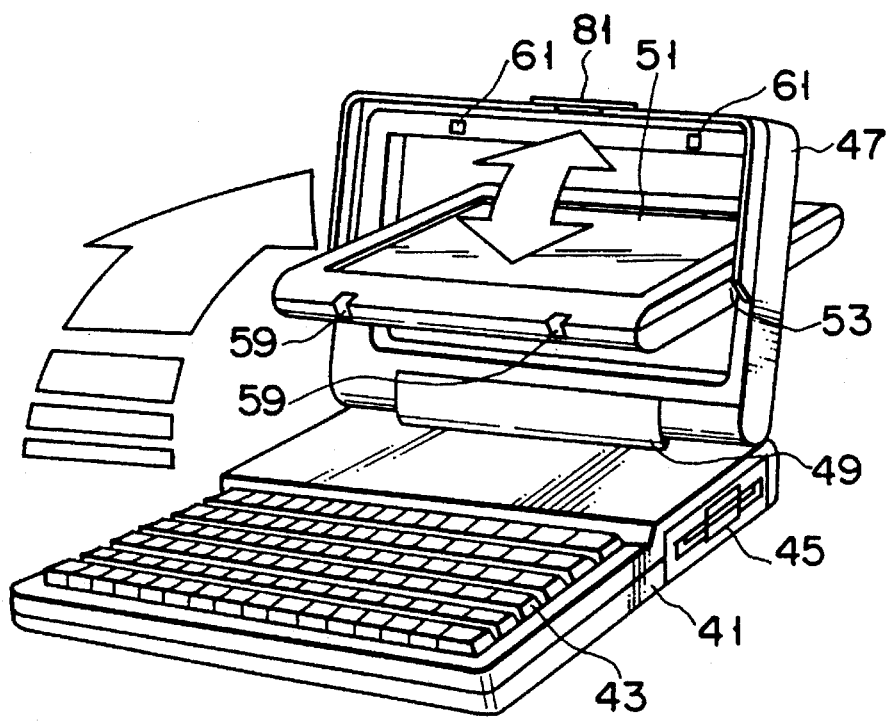
FIG. 12 is a perspective view showing an outer appearance of a portable computer according to the third embodiment of the present invention.
Figure 13:
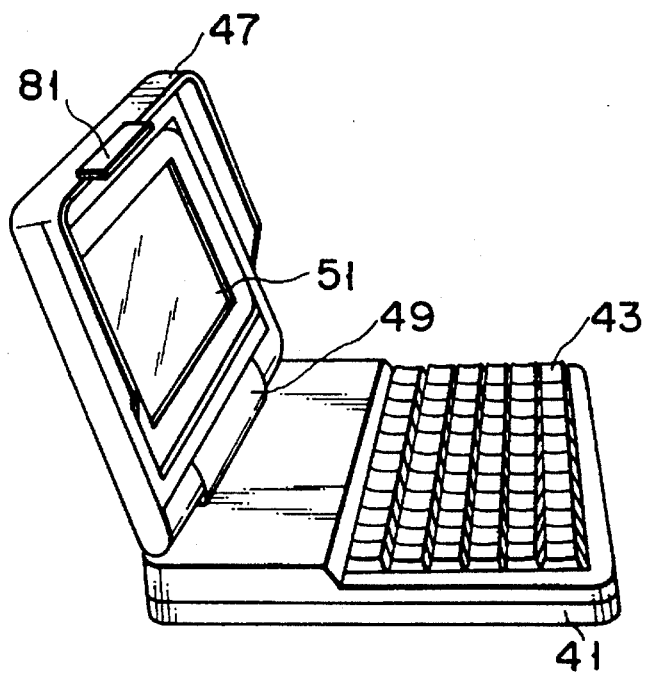
FIG. 13 is a perspective view showing a state wherein a key input is performed using a keyboard in the portable computer shown in FIG. 12.

FIG. 12 is a perspective view showing a characteristic state of a portable computer of the third embodiment, and FIG. 13 is a perspective view showing a state wherein a key input operation is performed using a keyboard 43. As shown in FIGS. 12 and 13, the keyboard 43 is stored in the upper surface of a main body unit 41. A housing of the main body unit 41 stores a floppy disk drive (FDD) 45, a microprocessor unit (MPU), a memory, a power supply device, and the like. The main body unit 41 is pivotally coupled to a support unit 47 for supporting a display/input unit 51 (to be described later) via a first hinge mechanism 49. The first hinge mechanism 49 can pivot the support unit 47 through about 140° about its rotational shaft from a state wherein the unit 47 is overlaid on the main body unit 41.

The support unit 47 is used as an outer frame for mounting the display/input unit 51 to the main body unit 41. The display/input unit 51 is pivotally coupled to the support unit 47 via a second hinge mechanism 53 arranged between the support unit 47 and the display/input unit 51. The display/input unit 51 is constituted by overlaying, e.g., a coordinate input transparent tablet on a low-profile display, and performs coordinate measurement by an electrostatic coupling system. The second hinge mechanism 53 is arranged at the vertically central position of the display/input unit 51, and has a rotational shaft parallel to that of the first hinge mechanism 49. The second hinge mechanism 53 can pivot the display/input unit 51 within a range of, e.g., 180°.

Figure 14:
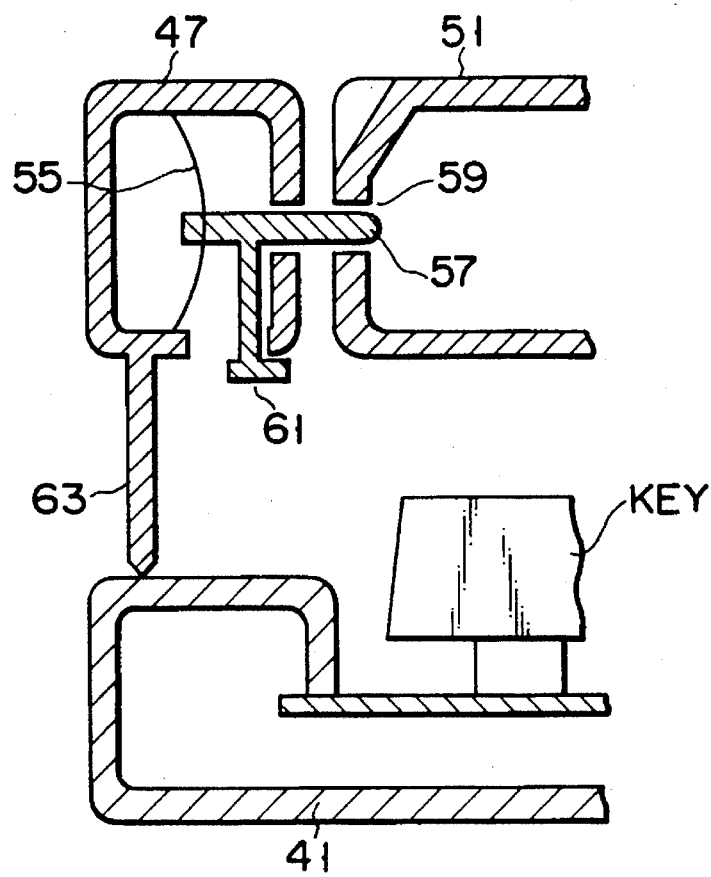
FIG. 14 is a sectional view of a rotation lock mechanism shown in FIG. 12.

A rotation lock mechanism for fixing a rotational position of the display/input unit 51 is arranged between the display/input unit 51 and the support unit 47. The rotation lock mechanism has an arrangement, as shown in FIG. 14. More specifically, lock pins 57 biased by springs 55 project to the interior (on a side facing the display/input unit 51) of the support unit 47, and holes 59 for receiving the lock pin 57 are formed in end portions (on two horizontal sides) of the display/input unit 51 in correspondence with the positions of the lock pins 57. When the lock pins 57 are fitted in the holes 59, the display/input unit 51 is fixed in position. Thus, the rotational position of the display/input unit 51 can be fixed in 0° and 180° positions. The lock pins 57 can be disengaged from the holes 59 upon operation of lock release buttons 61 arranged on a side facing the keyboard 43.

Note that a hollow portion (not shown) is formed in the support unit 47 on a side opposite to the second hinge mechanism 53 so as to support the display/input unit 51 on the support unit 47, and signal lines for connecting between the main body unit 41 and the display/input unit 47 extend from a side of the support unit 47 Opposing the second hinge mechanism 53 to the display/input unit 51 via the hollow portion.

As shown in FIG. 14, a projecting portion 63 is formed in the outer edge of the support unit 47 on a side facing the keyboard 43 or near this outer edge. The projecting portion 63 defines an interval (an interval between the keyboard 43 and the display/input unit 51) for preventing the support unit 47 from being too close to the main body unit 41. The projecting portion 63 prevents entrance of a foreign matter from a gap between the support unit 47 and the main body unit 41, and also protects the side surface of the keyboard 43.

The support unit 47 has substantially the same level as a display/input surface of the display/input unit 51 in a handwriting input state shown in FIG. 16 (to be described later).

Setup states of the computer according to purposes will be described below.

When a key input operation is performed using the keyboard 43, the computer is set in a state shown in FIG. 13. More specifically, the support unit 47 is pivoted about the rotational shaft of the first hinge mechanism 49 and is lifted up so as to be set at a position where a displayed content is easy to see, and the keyboard 43 is unlocked to be ready for use. In this case, the display/input unit 51 is fixed by the rotation lock mechanism so that the display/input surface faces a user (keyboard side).

Figure 15:
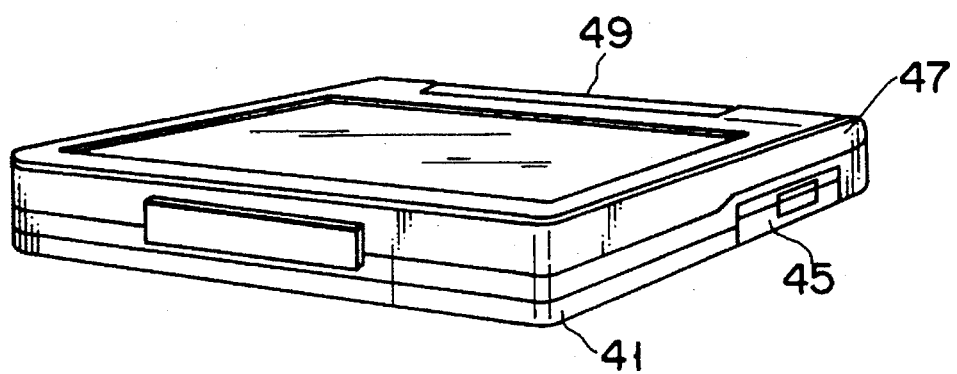
FIG. 15 is a perspective view showing a non-use state of the portable computer shown in FIG. 12.

When the computer is not used (in a storage or carrying state), it is set in a state shown in FIG. 15. More specifically, the support unit 47 is folded from the state shown in FIG. 13 by the first hinge mechanism 49, and is overlaid on the main body unit 41. In this case, the display/input unit 51 is fixed, so that the display/input surface faces the keyboard 43. As a result, the rear surface of the display/input unit 51 is exposed to the outside.

When a handwriting input operation is performed, the computer is set in a state shown in FIG. 16. More specifically, the lock pins 57 are disengaged by the lock release buttons 61, and the display/input unit 51 is fixed by the rotational shaft of the second hinge mechanism 53, as shown in FIG. 12. The support unit 47 is folded to be overlaid on the main body unit 41, thus establishing the state shown in FIG. 16. As shown in FIG. 16, the display/input surface of the display/input unit 51 faces up, and is set at substantially the same level as the support unit 47. Therefore, a handwriting input operation using a pen can be performed.

Since the lock release buttons 61 are arranged on the inner surface side of the support unit 47, the display/input unit 51 will not be erroneously unlocked and rotated during an operation of the computer or during a handwriting input operation.

In this manner, the computer can be set in a state according to a key input operation or a handwriting input operation, and a data input operation can be performed. Input data is subjected to input mode processing. For example, when characters are input by handwriting, characters are recognized on the basis of handwriting patterns to generate character codes. When a software keyboard is used, key codes according to touched key tops are generated. A document created in this manner is stored in a floppy disk (FD) inserted in the FDD 45, as shown in FIG. 17.

In this manner, both the key and handwriting input operations can be performed, and the state of the computer can be set according to an input method. Since the computer is integrated, it is convenient for carrying, and requires a minimum desk-top space regardless of the input methods. Furthermore, since the handwriting input operation is performed while the display/input unit 51 is overlaid on the main body unit 41, keys will not be accidentally depressed.

The fourth embodiment of the present invention will be described below.

Figure 18:
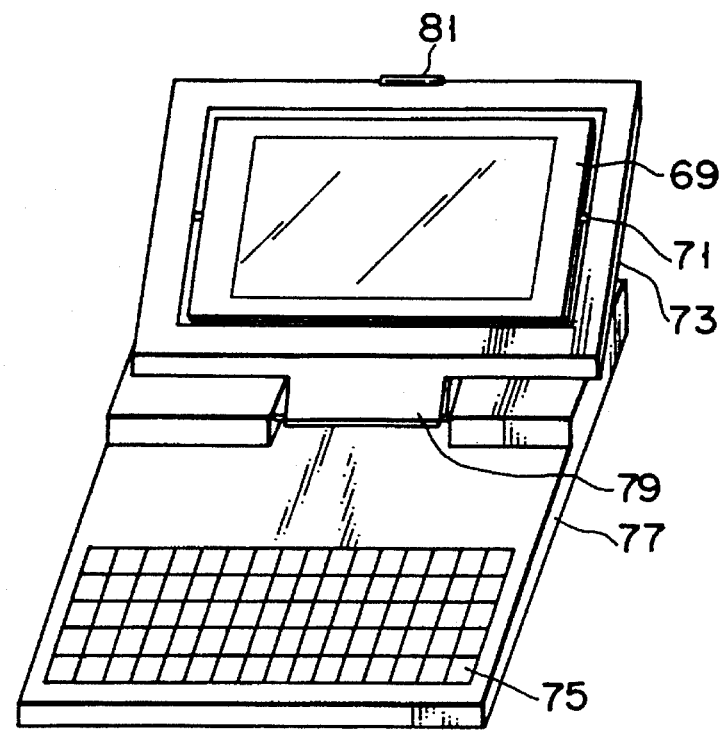
FIG. 18 is a perspective view showing a portable computer according to the fourth embodiment of the present invention.
Figure 19:
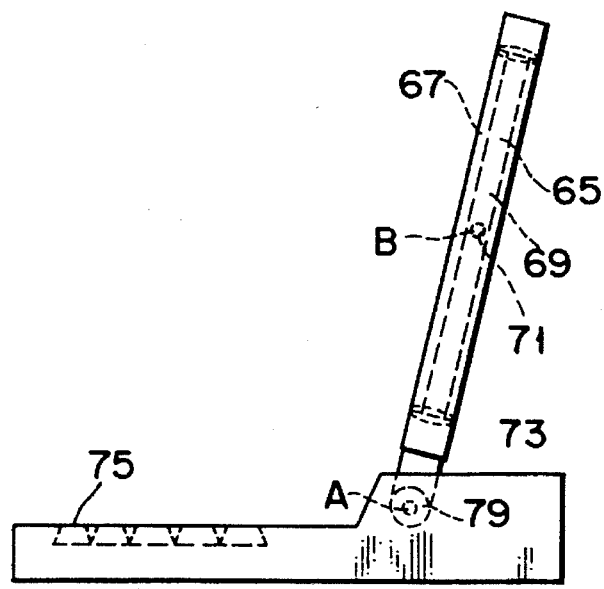
FIG. 19 is a side view of the portable computer shown in FIG. 18.
Figure 20:
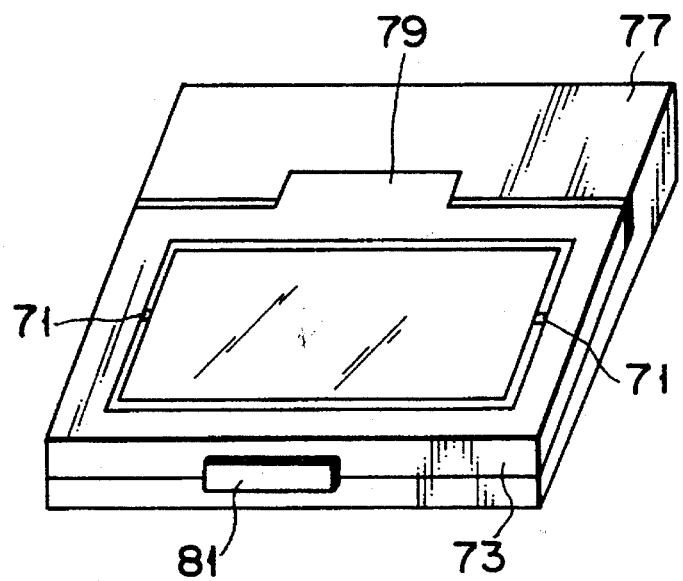
FIG. 20 is a perspective view showing a non-use state of the portable computer shown in FIG. 18.
Figure 21:
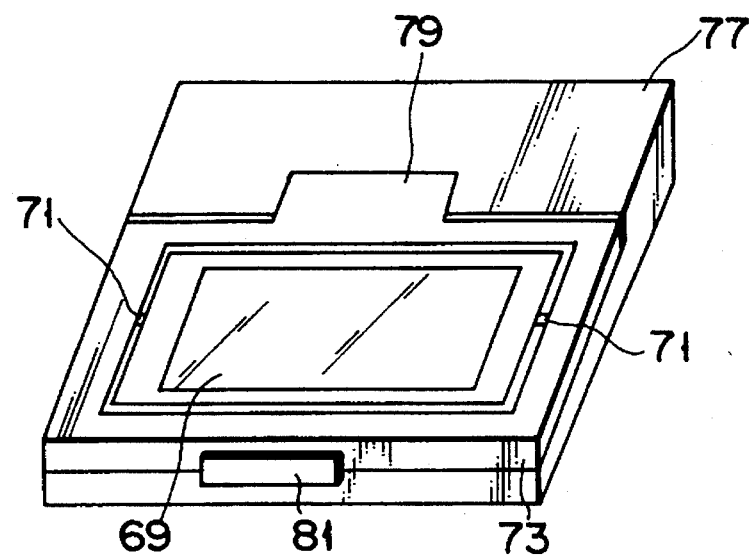
FIG. 21 is a perspective view showing a state wherein data is input from an integrated display/input device in the portable computer shown in FIG. 20.

FIG. 18 is a perspective view showing an arrangement of a portable computer according to the fourth embodiment, FIG. 19 is a side view of the portable computer shown in FIG. 18, FIG. 20 is a perspective view showing a non-use state of the portable computer, and FIG. 21 is a perspective view showing a state of the computer when data is input from an integrated display/input device (to be referred to as an input/display unit hereinafter).

As shown in FIGS. 18 through 23, the portable computer of the fourth embodiment is constituted by an input/display unit 69 consisting of a display unit 65 and a transparent tablet 67, an upper cover 73 comprising a second hinge mechanism 71 for coupling the input/display unit 69 and allowing rotation of it, and a main body case 77 for storing a keyboard 75. The input/display unit 69 is integrated by overlaying the coordinate input transparent tablet 67 on a liquid crystal display (LCD), and performs coordinate measurement by an electrostatic coupling system. A mechanism (rotational range regulating mechanism) for regulating a rotational range of the input/display unit 69 by the second hinge mechanism 71 is arranged between the upper cover 73 and the input/display unit 69. The rotational range regulating mechanism will be described later.

The input/display unit 69 is coupled by the second hinge mechanism 71 to have the upper cover 73 as its outer frame. The upper cover 73 is rotatably arranged by a first hinge mechanism 79 arranged on the upper surface portion of the main body case 77 when the upper cover 73 and the main body case 77 overlap each other, the upper cover 73 is fixed by a latch mechanism 81.

The first and second hinge mechanisms 79 and 71 have a balance function capable of setting an arbitrary angle by a brake mechanism such as a torsion bar mechanism or a frictional hinge.

Note that signal lines are arranged in the same manner as in the third embodiment.

When the keyboard 75 is used as the input means, as shown in FIGS. 18 and 19, the lock mechanism 81 (for example, a latch mechanism arranged at the front edge of the main body case 77) is disengaged to set the first hinge mechanism 79 in a neutral state, and the upper cover 73 is lifted up about a rotational shaft (designated by symbol A in FIG. 19) of the first hinge mechanism 79. The upper cover 73 is set at an arbitrary angle so that the display unit 65 faces an operator. Thus, the operator can see the content of the display unit 65 through the transparent tablet 67.

When the portable computer is not used (in a storage or carrying state), the first hinge mechanism 79 is set in a neutral state, as shown in FIG. 20, and is returned to an initial state so that the upper cover 73 is overlaid on the main body case 77 in this state. Thereafter, the upper cover 73 and the main body case 77 are fixed to each other by the latch mechanism 81. In this case, the upper cover 73 serves as a protection case for the input/display unit 69.

When the input/display unit (transparent tablet 67) is used as the input means, the input/display unit 69 is caused to face an operator by the first hinge mechanism 79, and an upper portion of the unit 69 is pressed to rotate (180°) only the input/display unit 69 about a rotational shaft (denoted by symbol B in FIG. 19) of the second hinge mechanism 71. Thereafter, the first hinge mechanism 79 is set in a neutral state, and the upper cover 73 is overlaid on the main body case 77. The upper cover 73 and the main body case 77 state, as shown in FIG. 21, since the input/display unit 69 (transparent tablet 67) faces up and is set in a horizontal state, operability for performing a handwriting input operation can be greatly improved.

The rotational range regulating mechanism for fixing the input/display unit 69 rotated by the second hinge mechanism 71 and for regulating a rotational range (a folding operation through 180°) will be described below. The rotational range regulating mechanism can prevent wiring lines in the input/display unit 69 (the display unit 65 and the transparent tablet 67) from being excessively twisted.

Figure 22:
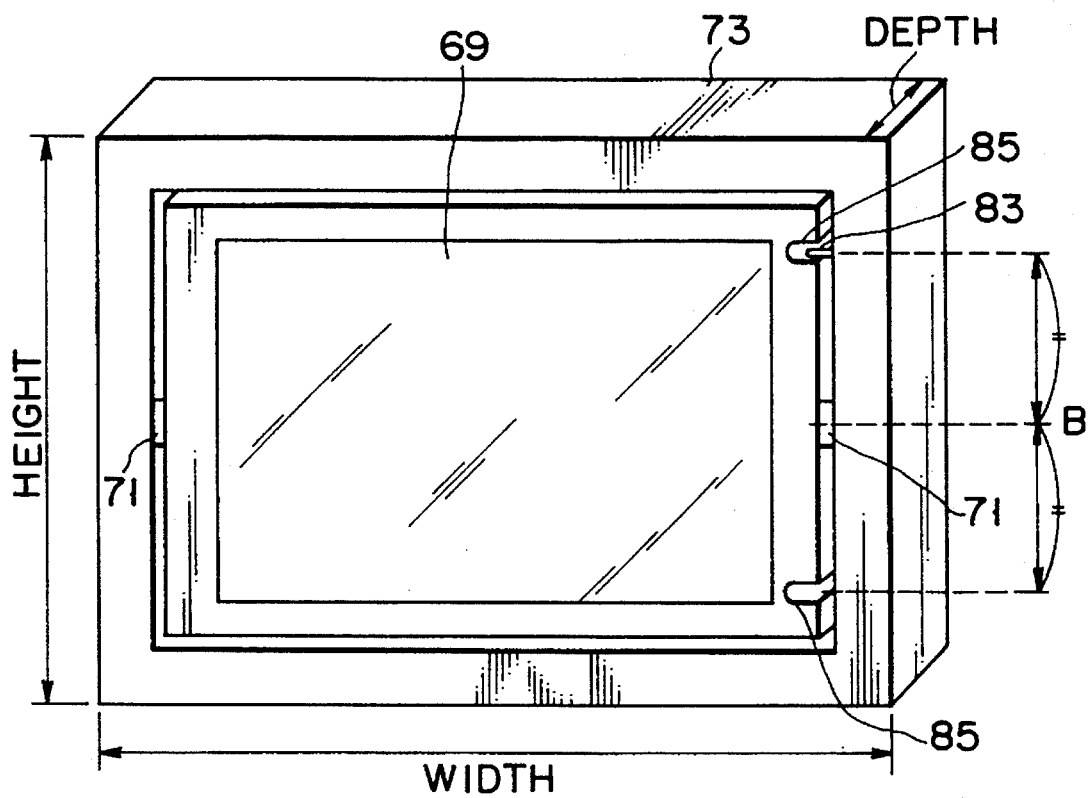
FIG. 22 is a perspective view showing an upper cover for explaining a rotational range regulating mechanism in the portable computer shown in FIG. 18.
Figure 23:
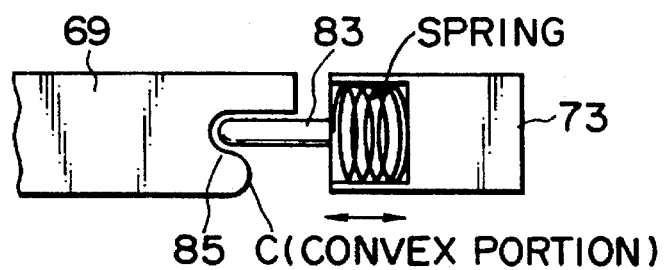
FIG. 23 is a view showing the relationship between an input/display unit fixing rod and an input/display unit fixing rail for explaining the rotational range regulating mechanism in the portable computer shown in FIG. 18.

FIG. 22 is a view for explaining the rotational range regulating mechanism, and illustrates only the upper cover 73. Input/display unit fixing rods 83 for regulating the rotational range of the input/display unit 69 and fixing its position are arranged at the central position of the upper cover 73 in a direction of its thickness (depth). Each input/display unit fixing rod 83 is slightly pushed in by an elastic member such as a spring. Input/display unit fixing rails 85 are formed in the input/display unit 69 at positions (two positions symmetrical about a rotational shaft B) corresponding to the input/display unit fixing rods 83, as shown in FIG. 23. The input/display unit fixing rod 83 is pushed into each input/display fixing rail 85 (designated by symbol C in FIG. 23), and is restored to an original state in a recess portion of the rail 85, thereby fixing the input/display unit 69. Since the input/display unit fixing rails 85 are arranged at positions symmetrical about the rotational shaft B of the second hinge mechanism 71, the input/display unit can be rotated through 180°.

The second hinge mechanism 71 is located at the central position of the input/display unit 69 in a direction of its height, can use a brake mechanism such as a torsion bar mechanism or a frictional hinge, and has a cavity in its central portion to allow wiring lines of the display unit 65 and the transparent tablet 67 to pass therethrough.

In this manner, the portable computer comprising the two input means, i.e., the keyboard 75 and the coordinate input transparent tablet 67 can be further rendered compact without reducing the size of the keyboard 75, and can also facilitate carrying. In particular, since the transparent tablet 67 can have the same size as the display unit 65, input operability will not be disturbed. Since the input/display unit 69 can be rotated in the upper cover 73, the portable computer can be set in an optimal state according to the input means to be used (input/display unit 69 or the keyboard 75). When the computer is not used, the upper cover 73 can serve as a protection case of the input/display unit 69.

The fifth embodiment of the present invention will be described below.

Figure 24:
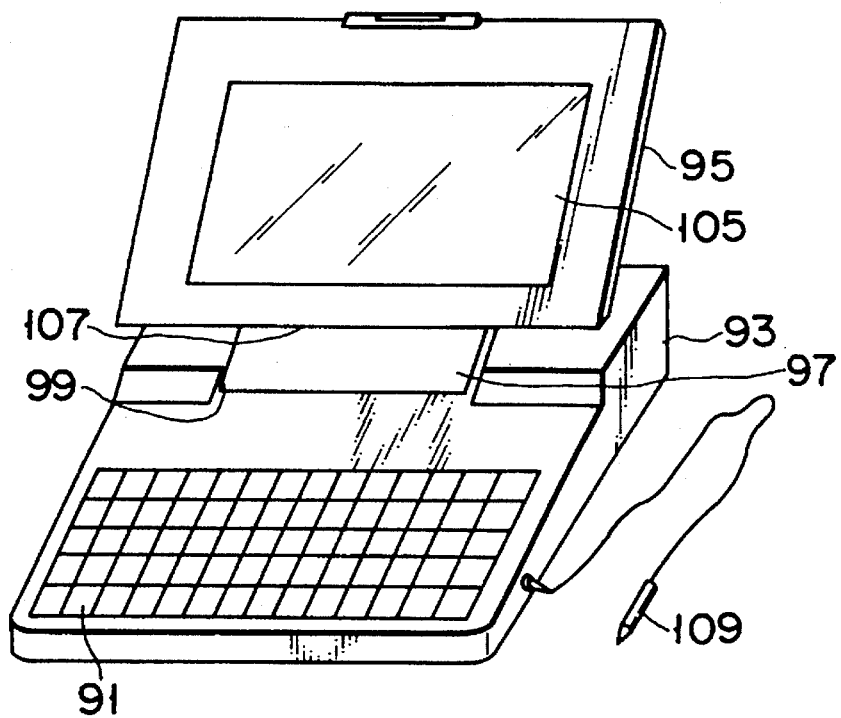
FIG. 24 is a perspective view of a portable computer according to the fifth embodiment of the present invention.
Figure 25:
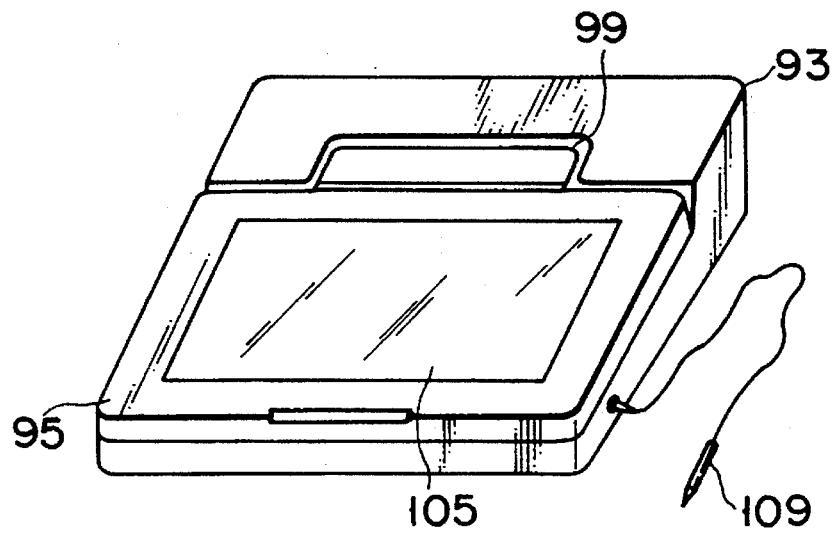
FIG. 25 is a perspective view showing a handwriting input mode in the portable computer shown in FIG. 24.
Figure 26:
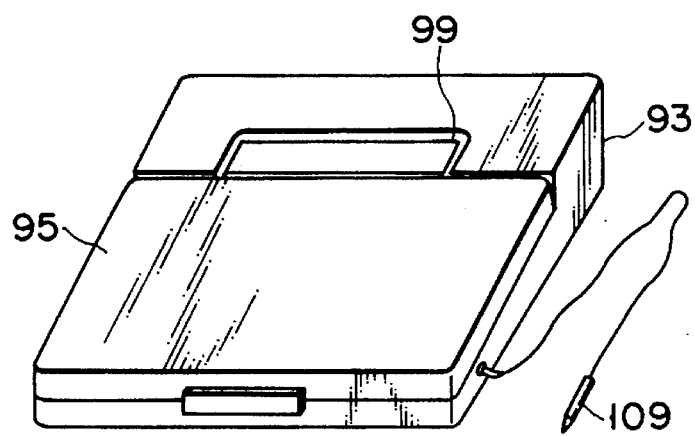
FIG. 26 is a perspective view showing a non-use state of the portable computer shown in FIG. 24.

As shown in FIGS. 24 through 26, a portable computer of the fifth embodiment comprises a main body case 93 on an upper surface of which a keyboard 91 is arranged, an upper cover 95, a first hinge mechanism 99 for pivotally coupling a junction upper cover 97 on the upper surface of the main body case 93, and a second hinge mechanism 107 for rotatably coupling the upper cover 95 which stores an integrated display/input device 105 consisting of a display (LCD) 101 and a transparent tablet 103 to the Junction upper cover 97.

The main body case 93 stores a hard disk drive (HDD), a floppy disk drive (FDD), a CPU, a memory a power supply device, and the like. In addition, a coordinate conversion circuit (to be described later) for performing a screen display according to an input mode is arranged.

The integrated display/input device 105 is constituted by overlaying the coordinate input transparent tablet 103 on a low-profile display such as a liquid crystal display, and performs coordinate measurement by an electrostatic coupling system. The device 105 detects a coordinate position on the transparent tablet 103 designated by a stylus pen 109.

The first hinge mechanism 99 can pivot the junction upper cover 97 and the upper cover 95 through about 140° from a state wherein they are overlaid on the keyboard 91. The mechanism 99 has a brake mechanism such as a torsion bar mechanism or a frictional hinge, and can set the upper cover 95 at an arbitrary angle. When the upper cover 95 and the main body case 93 overlap each other, they can be fixed by a latch mechanism arranged at their corresponding positions.

The second hinge mechanism 107 allows the upper cover 95 storing the integrated display/input device 105 to rotate in the horizontal direction on the junction upper cover 97. The arrangement of the second hinge mechanism 107 is shown in FIG. 27 (partial enlarged view) and FIG. 28 (exploded view).

Figure 27:
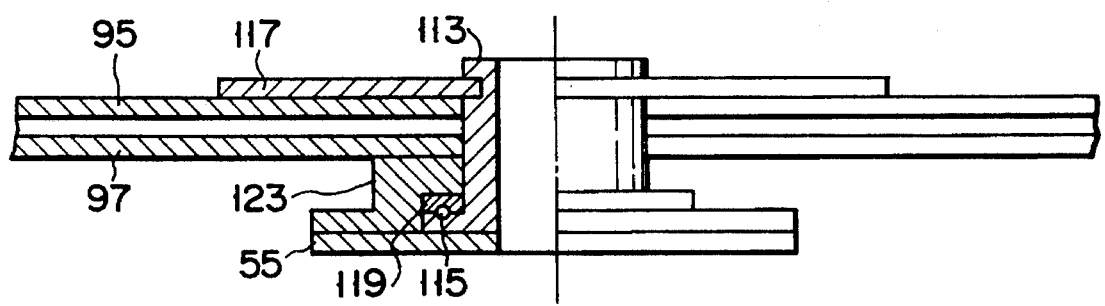
FIG. 27 is a partial enlarged view of a second hinge mechanism in the fifth embodiment.
Figure 28:
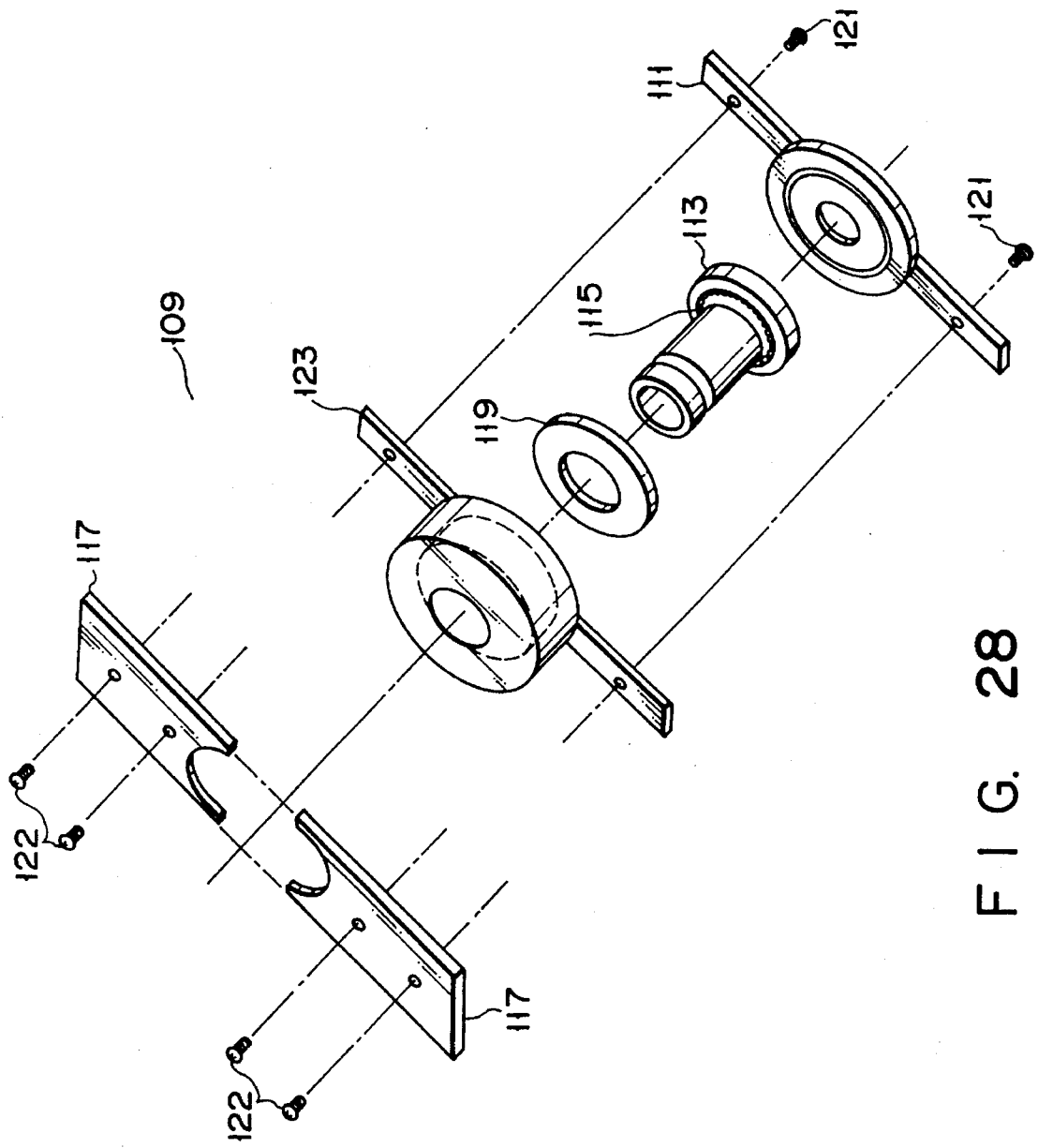
FIG. 28 is an exploded view of the second hinge mechanism shown in FIG. 27.

As shown in FIGS. 27 and 28, a rotational shaft receiving member 111 is fixed to the junction upper cover 97. A groove, having the same diameter as that of a rotational shaft 113, for holding the bottom portion of the rotational shaft 113 is formed in the upper surface portion of the rotational shaft receiving member 111. The rotational shaft 113 serves as a main shaft of the upper cover 95 and the Junction upper cover 97. A bearing 115 is arranged on the bottom portion of the rotational shaft 113 to facilitate rotation. A recess for receiving upper cover fixing plates 117 to be fixed to the upper cover 95 is formed in the distal end of the upper portion of the rotational shaft 113. A ring-like rotational shaft support member 119 for minimizing a lateral gap of the rotational shaft 113 to stabilize the shaft is fitted on the rotational shaft 113. Furthermore, a rotational cover 123 for storing the rotational shaft 113, the bearing 115, and the rotational shaft support member 119 on the rotational shaft receiving member 111 is fixed to the rotational shaft receiving member 111 by small screws 121 to support the entire rotating mechanism. The rotational cover 123 storing the rotational shaft 113 and the rotational shaft receiving member 111 are fixed to the junction upper cover 97 by the small screws 121. After the upper cover is fitted on the rotational shaft 113 projecting from the rotational cover 123, the upper cover fixing plates 117 are fitted in the recess of the rotational shaft 113 from the two sides, and are fixed on the upper cover 95 by small screws 122. In this manner, the junction upper cover 97 and the upper cover 95 are pivotally coupled to each other. The second hinge mechanism 107 has an internal cavity for arranging a cable for transmitting a display control signal and a tablet control signal. Signal lines extend via the junction upper cover 97 via the cavity, and are connected to the integrated display/input device 105.

FIGS. 29 and 30 show an arrangement of a rotation brake mechanism for regulating a pivotal range by the second hinge mechanism 107. FIG. 29 is a top view of the junction upper cover 97, and FIG. 29 is a sectional view for explaining a function (a rotation rail 125 is illustrated by a straight line for the sake of illustrative convenience).

As shown in FIGS. 29 and 30, the rotation rail 125 is formed on the upper surface portion of the junction upper cover 97. The rotation rail 125 is formed at a position almost corresponding to half a circle having the rotational shaft 113 as the center, and defines a pivotal range of the upper cover 95 (in this case, a range of 0° to 180°). Recess/projection portions 127 for gently stopping the rotation of the upper cover 95 and holding rotational positions are formed at the end portions of the rotation rail 125.

A damper 129 serving as an anti-vibration shaft which can be smoothly moved along the rotation rail 125 is mounted on the lower portion of the upper cover 95 (on a side facing the junction upper cover 97) at a position corresponding to the rail 125 via an elastic member 133 in an elastic member protection cover 131. The elastic member protection cover 131 is a columnar shaft extending from the upper cover 95, and stores the damper 129 and the elastic member 133. The elastic member 133 serves as a cushion between the damper 129 and the upper cover 95.

The upper cover 95 can be pivoted within a range wherein the damper 129 is located in the rotation rail 125. At the recess/projection portion 127 at each end portion of the rotational rail 125, the damper 129 is braked by the projection portion, and is held by the recess portion.

Figure 31:
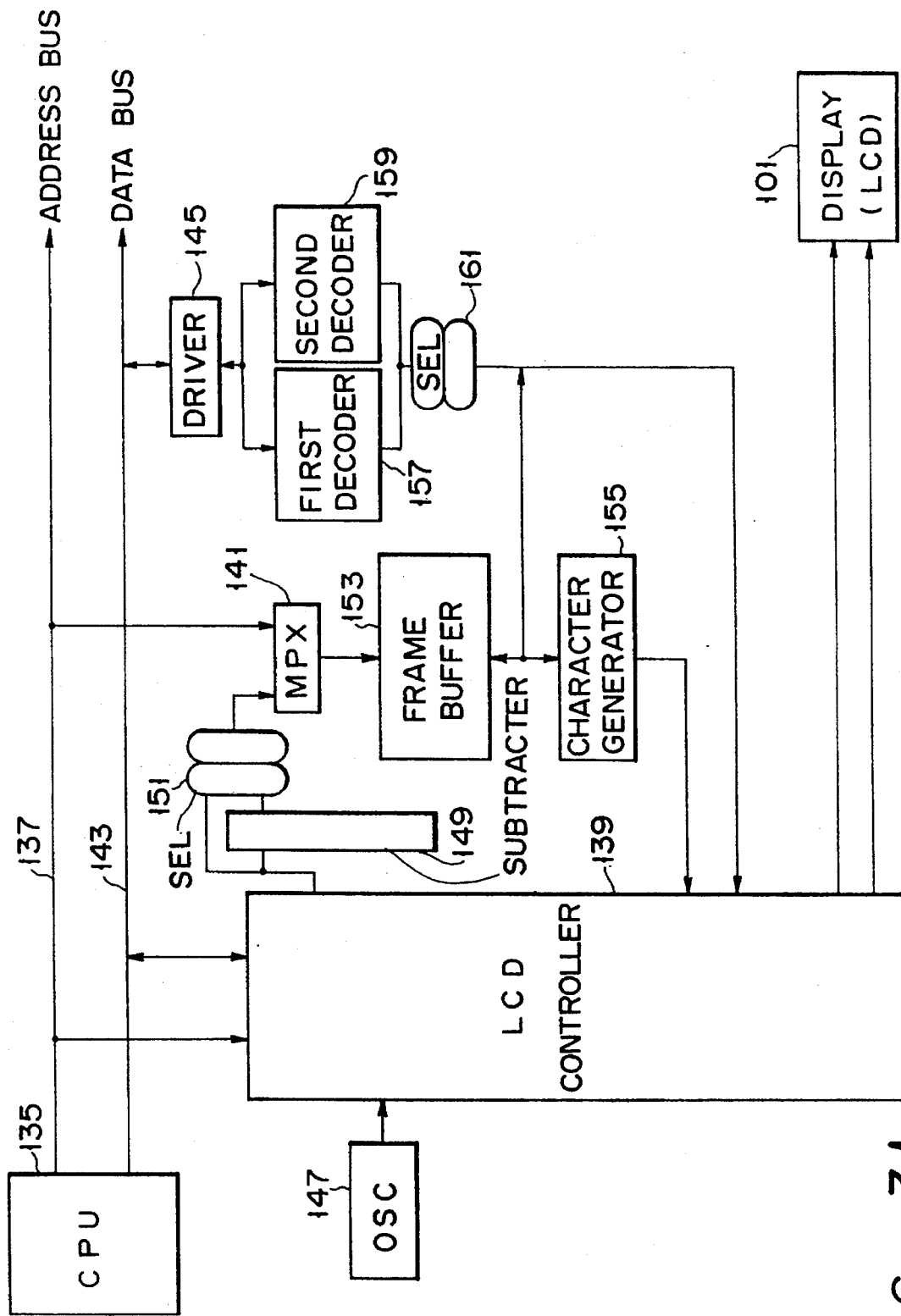
FIG. 31 is a block diagram showing a coordinate conversion circuit.

An arrangement of a coordinate conversion circuit for performing a display according to an input mode will be described below. FIG. 31 shows an arrangement of the coordinate conversion circuit.

A CPU 135 is connected to an LCD controller 139 and a multiplexer (MPX) 141 via an address bus 137, and is connected to the LCD controller 139 and a driver 145 via a data bus 143. The LCD controller 139 is operated in synchronism with a clock signal from an oscillator 147. A display address generated by the LCD controller 139 is supplied to a first selector 151 directly and via a subtractor 149. The subtractor 149 performs address correction to correct the origin on the display 101 at a diagonal position and to reverse a direction of a scanning line. The subtractor 149 performs address correction on the basis of equation (1) below, thus obtaining a display address after replacement (replaced address).

Replaced Display Address=End Address−Display Address    (1)

For example, if the end address of display addresses is "7f3f", i.e., if normal display addresses of a frame fall within a range of "0000" to "7f3f", as shown in FIG. 32A, a display address after replacement (replacement address) is as shown in FIG. 32B. The first selector 151 controls whether a normal address from the LCD controller 139 or a replacement address obtained by correcting the normal address by the subtractor 149 is output to the MPX 141. The MPX 141 switches a physical address of the CPU 135 and a display address. The MPX 141 is connected to a frame buffer 153. Furthermore, the frame buffer 153 is connected to a character pattern generator 155 for storing existing character patterns.

Figure 33A:
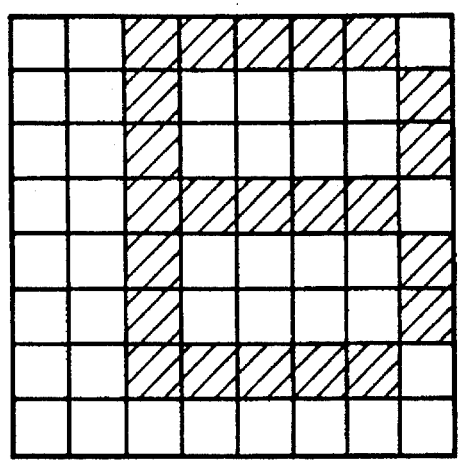
FIGS. 33A and 33B are views for explaining replacement of display pattern data strings.
Figure 33B:
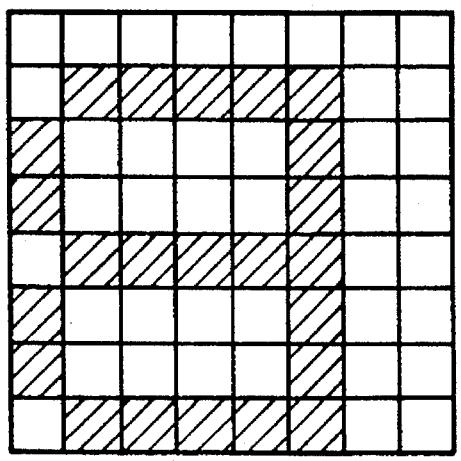

The driver 145 is connected to first and second decoders 157 and 159. The first decoder 157 outputs a display pattern as a normal data string. The second decoder 159 outputs data while replacing its upper and lower bits. For example, when the first decoder 157 outputs normal data shown in FIG. 33A, the second decoder 159 outputs replacement data, as shown in FIG. 33B. A second selector 161 controls whether normal data or replacement data is to be output. The second and first selectors 161 and 151 are operated in correspondence with each other. In this manner, the origin is changed to a diagonal position (vertically inverted) to perform display of the display 101 in accordance with the input mode. Note that selections by the first and second selectors 151 and 161, i.e., the input mode can be switched automatically or manually. An automatically inverted display can be attained as follows. For example, a mechanism for detecting rotation of the integrated display/input device 105 is arranged in the second hinge mechanism 107, and when the pivot angle of the integrated display/input device 105 exceeds a predetermined angle, the second selector 161 is operated to perform an inverted display. When the selection is manually performed, an inverted display may be performed in response to depression of a specific key on the keyboard 91, or may be performed by selecting an icon using the tablet 103 and the stylus pen 109. Furthermore, a special-purpose inverted display switch may be arranged on the side surface of the main body, and an inverted display may be made when the switch is turned on.

The respective use states of the portable computer of the fifth embodiment will be described below.

FIG. 26 shows a non-use state of the portable computer. In this state, the main body case 93 and the upper cover 95 overlap each other and are fixed by the latch mechanism. In this case, the integrated display/input device 105 faces the main body case 93 side, i.e., the keyboard 91.

In a key input mode for performing a key input operation from the keyboard 91 as a personal computer or a word-processor, the portable computer is set in a state shown in FIG. 24. More specifically, the upper cover 95 is lifted up, and the display screen is fixed at an angle where it is easy to see by the brake mechanism of the first hinge mechanism 99. In this case, not only a key input from the keyboard 91 but also an input from the integrated display/input device 105 using the stylus pen 109 are available.

In a handwriting input mode for performing a data input operation from the integrated display/input device 105, the portable computer is set in a state shown in FIG. 25. More specifically, the upper cover 95 is rotated through 180° by the second hinge mechanism 107 while it stands upright. The upper cover 95 is held by the rotation brake mechanism in a position where the upper cover 95 is rotated through 180°. The upper cover 95 is then overlaid on the main body case 93 by the first hinge mechanism 99. In a state shown in FIG. 25, the integrated display/input device 105 faces up, and is set in a horizontal state. For this reason, operability upon a handwriting input operation using the stylus pen 109 can be greatly improved. When a state shown in FIG. 24 is changed to a state shown in FIG. 25, the direction of the display 101 is vertically reversed. In this case, since the display content can be changed by the coordinate conversion circuit, the direction of the portable computer need not be changed.

The sixth embodiment will be described below with reference to FIGS. 34 through 36. The same reference numerals in the sixth embodiment denote the same parts as in the fifth embodiment, and a description thereof is omitted.

FIG. 34 is a perspective view showing a state wherein an input operation is performed from a keyboard 91 of the portable computer, FIG. 35 is a perspective view showing a state wherein an input operation is performed from an integrated display/input device 105, and FIG. 36 is a perspective view showing a non-use state.

The portable computer shown in FIGS. 34 through 36 comprises a rotary mechanism 165 for rotatably coupling a junction base 163 on the upper surface of a main body case 93, and a hinge mechanism 167 for pivotally coupling an upper cover 95 to the junction base 163.

The rotary mechanism 165 can pivot the upper cover 95 through about 140° from a state wherein the cover 95 is overlaid on the main body case 93. The mechanism 165 has a brake mechanism such as a torsion bar mechanism or a frictional hinge, and can set the upper cover 95 at an arbitrary angle. When the upper cover 95 and the main body case 93 overlap each other, they can be fixed by latch mechanisms arranged at their corresponding positions.

The hinge mechanism 167 allows horizontal pivotal movement of the upper cover 95 storing an integrated display/input device 105 and the junction base 163. Note that signal lines are connected to the integrated display/input device 105 via the rotary mechanism 165 and the hinge mechanism 167.

A coordinate conversion circuit for performing a display according to an input mode performs the same processing as described above.

The respective use states of the portable computer will be explained below.

FIG. 36 shows a non-use state of the portable computer. In this state, the main body case 93 and the upper cover 95 overlap each other and are fixed by the latch mechanisms. In this case, the integrated display/input device 105 faces the main body case 93 side, i.e., a keyboard 91.

In a key input mode for performing a key input operation from the keyboard 91 as a personal computer or a word-processor, the portable computer is set in a state shown in FIG. 34. More specifically, the upper cover 95 is lifted up, and a display screen is fixed by the brake mechanism of the hinge mechanism 167 at an angle where the screen is easy to see. In this case, not only a key input from the keyboard 91 but also an input from the integrated display/input device 105 using a stylus pen 109 are available.

In a handwriting input mode for performing a data input operation from the integrated display/input device 105, the portable computer is set in a state shown in FIG. 35. More specifically, the upper cover 95 is rotated through 180° by the rotary mechanism 165 while it stands upright. The upper cover 95 may be held by the above-mentioned rotation brake mechanism in a position where the upper cover 95 is rotated through 180°. The upper cover 95 is overlaid on the main body case 93 by the hinge mechanism 167. In a state shown in FIG. 35, the integrated display/input device 105 faces up, and is set in a horizontal state. For this reason, operability upon a handwriting input operation using the stylus pen 109 can be greatly improved. When a state shown in FIG. 34 is changed to a state shown in FIG. 35, the direction of a display 101 is vertically reversed. In this case, since the display content can be changed by the coordinate conversion circuit, the direction of the portable computer need not be changed.

Since the integrated display/input device 105 is arranged in this manner, the portable computer can be rendered compact, does not require a large installation area, and is convenient for carrying. When the portable computer is carried, the display screen of the integrated display/input device 105 is set to face the keyboard 91, thereby protecting the display surface. In a handwriting input mode, the display screen faces up, thereby improving operability.

In each of the embodiments shown in FIGS. 7A and 10A, the keyboard 27 is used as the input means. However, the integrated display/input device may be used together.

As a display means, flat panel displays such as a plasma display, an EL display, and the like may be used in addition to the LCD. In the above embodiment, the transparent tablet 21 is used. As a tablet, a tablet of an electrical resistance system, an electrostatic capacitance system, an electromagnetic induction system, an acoustic system, an ultrasonic system, an optical system, a pressure-sensitive system, or the like may be placed below the display unit 19 in use.

In some of the above system, the input pen used for tablet entry is connected to the tablet main body but in the remaining system, the pen is not connected to the main body.

when characters are input, a plurality of icons (soft keys) representing character keys may be displayed on the display unit 19 of the integrated display/input device 23, and may be pointed to input characters, in place of an input operation from the keyboard 27.

In the above description, the rotational range of the hinge units 31, 33, 35, and 38 used in the above embodiment is set to be 180°. However, the rotational range may be arbitrarily determined as long as an angle capable of pivoting the upper cover 25 and the main body case 29 to states shown in FIGS. 7A through 7D or FIGS. 10A through 10C can be set.

In the third embodiment, the display/input unit 51 can be pivoted through 180° by the second hinge mechanism 53. However, the rotational range and direction are not limited to those in the third embodiment as long as electrical connections between the support unit 47 and the display/input unit 51 via the second hinge mechanism 53 will not be twisted upon rotation of the display/input unit 51.

In the third embodiment, the direction of the rotational shaft of the first hinge mechanism 49 is parallel to that of the second hinge mechanism 53. However, the rotational shaft of the second hinge mechanism 53 may be set to be perpendicular to that of the first hinge mechanism 49 (the support unit 47 is rotated in a lateral direction when it is lifted up).

The rotation lock mechanism is arranged in the display/input unit 51 and the support unit 47 located at positions perpendicular to the rotational shaft of the second hinge mechanism 53, but may be arranged in the display/input unit 51 and the support unit 47 located at positions parallel to the rotational shaft of the second hinge mechanism 53. The lock pins 57 and the lock release buttons 61 are arranged on the support unit 47, and the holes 59 are formed in the display/input unit 51. However, the lock pins 57 and the lock release buttons 61 may be arranged on the display/input unit 51, and the holes 59 may be formed in the support unit 47.

In the fourth embodiment, the numbers of input/display unit fixing rods 83 and the input/display unit fixing rails 85 for regulating the rotational range of the input/display unit 69 are not limited to those in the above embodiment.

The rotational shaft B of the second hinge mechanism 71 is set to be parallel to the rotational shaft A of the first hinge mechanism but may be perpendicular to each other.

In each of the fifth and sixth embodiments, the rotation brake mechanism is not limited to that in the above embodiment. For example, a latch mechanism may be arranged between the junction upper cover 97 and the upper cover 95 to hold a rotational position.

When the coordinate conversion circuit inverts the origin position and scanning direction of the display 101, it may correct the end address (by subtracting an inverted value of the end address) after the display address output from the LCD controller 139 is inverted (by converting "0000" to "ffff").

In the above embodiments, signal lines extend through the cavity in the hinge unit to connect the main body and the display unit. However, for example, signal lines may extend from a portion of the main body case, may be covered with a protection member, and, then, may be connected to the display unit.

In the above embodiments, the embodiment wherein the hinge mechanism is arranged at the rear end portion of the main body case, and the embodiment wherein the hinge mechanism is arranged at the central portion of the main body case have been exemplified. However, in each of the embodiments, the hinge mechanism may be arranged at the rear end portion of the main body case or an arbitrary position offset from the rear end portion toward the central portion.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable computer comprising:

a main body case having two lateral sides;

a keyboard encased by said main body case;

an integrated display/input device having a coordinate input tablet overlaid on on a display device;

an upper cover encasing said integrated display/input device;

a junction base disposed between said two lateral sides;

a first hinge rotatably coupling said junction base to said main body case; and a second hinge rotatably coupling said upper cover to said junction base, said junction base comprising a cylindrical element defining a linear groove therethrough and said upper cover connects to said junction base through a projection that connects to said second hinge within said junction base at said linear groove; and wherein relative rotation of said upper cover and said junction base changes a form of said portable computer between a first closed form at which said keyboard and said integrated display/input device face each other, and a second closed form at which said upper cover overlays said keyboard to expose said integrated display/input device.

2. A portable computer comprising:

a keyboard;

a main body case with two lateral sides encasing said keyboard;

an integrated display/input device having a display and a coordinate input tablet, said display and said coordinate input tablet being overlapped;

an upper cover encasing said integrated display/input device, said upper cover having a first face in which said integrated display/input device is exposed, and a second face which is opposite to said first face;

a junction base disposed between said two lateral sides connecting said upper cover to said main body case;

a first hinge mechanism rotatably coupling said upper cover to said junction base along a first axis, said first hinge mechanism being rotatable between a closed position, at which said main body case and said upper cover face each other, and an open position at which said main body case and said upper cover do not face each other; and a second hinge mechanism rotatably coupling said junction base to said main body case along a second axis perpendicular to said first axis, said junction base comprising a cylindrical element defining a linear groove therethrough and said upper cover connects to said junction base through a projection that connects to said second hinge within said junction base at said linear groove; and wherein relative rotation of said upper cover and said junction base changes said portable computer first closed form at which said keyboard and said integrated display/input device face each other, and a second closed form at which said upper cover overlays said keyboard to expose said integrated display/input device.

3. A portable computer according to claim 2, further comprising a holding mechanism to hold a rotational position of said junction base rotated by said second hinge mechanism at one of said first and second positions.

4. A portable computer according to claim 3, further comprising:

detection means for detecting an angle through which said upper cover is rotated;

determination means for determining whether said angle detected by the detection means has reached a predetermined angle; and coordinate conversion means, operating when said determination means determines that said angle detected by said detection means has reached said predetermined angle, for performing coordinate conversion such that a display/input position at which data is displayed or input by said integrated display/input device is reversed 180° with reference to an ordinary coordinate system.

5. A portable computer according to claim 2, further comprising:

mode designation means for designating one of first and second modes, said first mode being a mode in which said integrated display/input device performs a display/input operation in an ordinary manner, and said second mode being a mode in which said integrated display/input device performs a display/input operation where a coordinate system used in said second mode is reversed 180° with reference to a coordinate system used in said first mode; and coordinate conversion means, operating when said second mode is designated by said mode designation means, for performing coordinate conversion such that said coordinate system used in said second mode is reversed 180° with reference to said coordinate system used in said first mode.

6. A portable computer comprising:

a main body case having two lateral sides;

a keyboard encased by said main body case;

an integrated display/input device having a coordinate input tablet overlaid on a display device;

an upper cover encasing said integrated display/input device;

junction base means between said two lateral sides;

first hinge means rotatably coupling said junction base means to said main body case; and second hinge means rotatably coupling said upper cover to said junction base means, said junction base comprising a cylindrical element defining a linear groove therethrough and said upper cover connects to said junction base through a projection that connects to said second hinge within said junction base at said linear groove; and wherein relative rotation of said upper cover and said junction base means changes said portable computer between a first closed form, at which said keyboard and said integrated display/input device face each other, and a second closed form at which said upper cover overlays said keyboard to expose said integrated display/input device.

* * * * *

UNITED STATES PATENT AND TRADEMARK OFFICE
CERTIFICATE OF CORRECTION

PATENT NO. : 5,594,619
DATED : January 14, 1997
INVENTOR(S) : Shigenori MIYAGAWA et al.

It is certified that error appears in the above-indentified patent and that said Letters Patent is hereby corrected as shown below:

In Claim 1, column 18, line 39, delete "on" (second occurrence).

Signed and Sealed this

Tenth Day of February, 1998

Attest:

BRUCE LEHMAN

*Attesting Officer*  *Commissioner of Patents and Trademarks*